United States Patent
Liu et al.

(10) Patent No.: US 11,812,450 B2
(45) Date of Patent: Nov. 7, 2023

(54) PHYSICAL DOWNLINK SHARED CHANNEL RESOURCES FOR REDUCED CAPABILITY USER EQUIPMENT

(71) Applicant: QUALCOMM Incorporated, San Diego, CA (US)

(72) Inventors: Le Liu, Fremont, CA (US); Alberto Rico Alvarino, San Diego, CA (US); Huilin Xu, San Diego, CA (US); Seyedkianoush Hosseini, San Diego, CA (US); Peter Pui Lok Ang, San Diego, CA (US); Tingfang Ji, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/031,869

(22) Filed: Sep. 24, 2020

(65) Prior Publication Data

US 2021/0099991 A1    Apr. 1, 2021

Related U.S. Application Data

(60) Provisional application No. 62/907,499, filed on Sep. 27, 2019.

(51) Int. Cl.
*H04W 72/51* (2023.01)
*H04L 5/00* (2006.01)
*H04W 72/23* (2023.01)

(52) U.S. Cl.
CPC ........... *H04W 72/51* (2023.01); *H04L 5/0048* (2013.01); *H04W 72/23* (2023.01)

(58) Field of Classification Search
CPC .. H04W 72/048; H04W 72/14; H04L 5/0048; H04L 5/0053; H04L 5/0051
See application file for complete search history.

(56) References Cited

U.S. PATENT DOCUMENTS

| | | |
|---|---|---|
| 2015/0365945 A1 | 12/2015 | Morioka et al. |
| 2018/0279289 A1 | 9/2018 | Islam et al. |
| 2019/0150164 A1 | 5/2019 | Nam et al. |

FOREIGN PATENT DOCUMENTS

| | | |
|---|---|---|
| EP | 3531566 A1 | 8/2019 |
| EP | 3567959 A1 | 11/2019 |
| WO | WO-2018171601 A1 | 9/2018 |

OTHER PUBLICATIONS

International Search Report and Written Opinion—PCT/US2020/052691—ISA/EPO—dated Nov. 20, 2020 (195317WO).

*Primary Examiner* — Justin T Van Roie
(74) *Attorney, Agent, or Firm* — Holland & Hart LLP

(57) ABSTRACT

Methods, systems, and devices for wireless communications are described. A user equipment (UE) may transmit a UE capability message to a base station, the UE capability message including an indication of a UE type, wherein the UE type is associated with at least one of a reduced bandwidth, or a reduced number of antennas, or a combination thereof for the UE. The UE may receive, based at least in part on the UE capability message, a downlink grant for downlink resources for a data transmission in accordance with a resource allocation scheme, wherein the resource allocation scheme is associated with the UE type and a supported bandwidth part of the UE. The UE may monitor a wireless channel based at least in part on the downlink grant. The UE may receive the data transmission based at least in part on the monitoring of the wireless channel.

21 Claims, 22 Drawing Sheets

Slot Configuration
205

Distributed Resource Allocation

Slot Configuration
210

PDSCH w/Low Coding Rate

Slot Configuration
215

PDSCH w/Intra-Slot Repetition

Slot Configuration
220

Localized Resource Allocation

PDCCH    PDSCH    DMRS
225        230        235

200

Slot Configuration
305

S=1 / TBS=16

Slot Configuration
310

S=0.125 / TBS=16

Slot Configuration
315

S=1 / TBS=24

Slot Configuration
320

S=0.125 / TBS=24

PDCCH    PDSCH    DMRS
325          330          335

300

Slot Configuration
405

Slot Configuration
410

PDCCH     PDSCH     DMRS
415         420         425

400

Slot Configuration
505

Slot Configuration
510

Slot Configuration
515

PDCCH    PDSCH    DMRS
520       525       530

⎯ 500

Slot Configuration 1005

Slot Configuration 1010

1000

PHYSICAL DOWNLINK SHARED CHANNEL RESOURCES FOR REDUCED CAPABILITY USER EQUIPMENT

CROSS REFERENCE

The present application for patent claims the benefit of U.S. Provisional Patent Application No. 62/907,499 by LIU et al., entitled "PHYSICAL DOWNLINK SHARED CHANNEL RESOURCES FOR REDUCED CAPABILITY USER EQUIPMENT," filed Sep. 27, 2019, assigned to the assignee hereof, and expressly incorporated by reference herein.

TECHNICAL FIELD

The following relates generally to wireless communications, and more specifically to physical downlink shared channel (PDSCH) resources for reduced capability user equipment (UE).

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communication system may include a number of base stations or network access nodes, each simultaneously supporting communication for multiple communication devices, which may be otherwise known as UE.

SUMMARY

The described techniques relate to improved methods, systems, devices, and apparatuses that support physical downlink shared channel (PDSCH) resources for reduced capability user equipment (UE). Generally, the described techniques provide for various mechanisms to ensure adequate scheduling for a UE type having a reduced number of antennas, a reduced bandwidth, and the like. For example, the UE type may be associated with a limited bandwidth, low complexity, low transmit power levels, a fewer number of receive antennas, an extended battery life, and the like. The UE may transmit or otherwise provide a UE capability message carrying or otherwise conveying an indication of the UE type. The UE capability message may be transmitted to a base station in general, although it is to be understood that the UE capability message may be provided to a network entity in some situations (e.g., when the UE is operating in an idle mode). Based on the UE type indicated in the UE capability message, the base station and UE both know that the UE type is associated with, for example, the reduced bandwidth, reduced number of antennas, low complexity, or low transmit power level. The base station (or network entity when the UE is operating in the idle mode) may select a resource allocation scheme for a downlink grant for the UE according to the UE capability message (e.g., based on the UE type). The base station may transmit the downlink grant identifying or otherwise indicating downlink resources for a downlink transmission to the UE in accordance with the resource allocation scheme. The base station may transmit the data transmission to the UE according to the downlink grant. Although a number of variations of the resource allocation scheme are described in detail below, some aspects may include an interleaved/discontinuous resource block (RB) spread over a subset of subbands of a bandwidth part (BWP), using a lower coding rate on a wideband data transmission, using intra-slot repetition on a wideband short data channel transmission, using inter-BWP and inter-slot frequency hopping in a narrowband long data transmission, and the like. Accordingly, aspects of the described techniques provide various enhancements for the data transmissions (e.g., PDSCH transmissions) that support the reduced capability UE type.

A method of wireless communication at a UE is described. The method may include transmitting a UE capability message to a base station, the UE capability message including an indication of a UE type, where the UE type is associated with at least one of a reduced bandwidth, or a reduced number of antennas, or a combination thereof for the UE, receiving, based on the UE capability message, a downlink grant for downlink resources for a data transmission in accordance with a resource allocation scheme, where the resource allocation scheme is associated with the UE type and a supported bandwidth part of the UE, monitoring a wireless channel based on the downlink grant, and receiving the data transmission based on the monitoring of the wireless channel.

An apparatus for wireless communication at a UE is described. The apparatus may include a processor, memory coupled with the processor, and instructions stored in the memory. The instructions may be executable by the processor to cause the apparatus to transmit a UE capability message to a base station, the UE capability message including an indication of a UE type, where the UE type is associated with at least one of a reduced bandwidth, or a reduced number of antennas, or a combination thereof for the UE, receive, based on the UE capability message, a downlink grant for downlink resources for a data transmission in accordance with a resource allocation scheme, where the resource allocation scheme is associated with the UE type and a supported bandwidth part of the UE, monitor a wireless channel based on the downlink grant, and receive the data transmission based on the monitoring of the wireless channel.

Another apparatus for wireless communication at a UE is described. The apparatus may include means for transmitting a UE capability message to a base station, the UE capability message including an indication of a UE type, where the UE type is associated with at least one of a reduced bandwidth, or a reduced number of antennas, or a combination thereof for the UE, receiving, based on the UE capability message, a downlink grant for downlink resources for a data transmission in accordance with a resource allocation scheme, where the resource allocation scheme is associated with the UE type and a supported bandwidth part of the UE, monitoring a wireless channel based on the downlink grant, and receiving the data transmission based on the monitoring of the wireless channel.

A non-transitory computer-readable medium storing code for wireless communication at a UE is described. The code may include instructions executable by a processor to transmit a UE capability message to a base station, the UE capability message including an indication of a UE type, where the UE type is associated with at least one of a reduced bandwidth, or a reduced number of antennas, or a combination thereof for the UE, receive, based on the UE capability message, a downlink grant for downlink resources for a data transmission in accordance with a resource allocation scheme, where the resource allocation scheme is associated with the UE type and a supported bandwidth part of the UE, monitor a wireless channel based on the downlink grant, and receive the data transmission based on the monitoring of the wireless channel.

In some examples of the method, apparatuses, and non-transitory computer-readable medium described herein, receiving the data transmission may include operations, features, means, or instructions for receiving the data transmission in an interleaved and discontinuous resource block spread over a subset of available subbands in the supported BWP, the subset based on the UE type.

In some examples of the method, apparatuses, and non-transitory computer-readable medium described herein, receiving the data transmission may include operations, features, means, or instructions for receiving the data transmission over the supported BWP and using a low coding rate, the low coding rate based on the UE type.

Some examples of the method, apparatuses, and non-transitory computer-readable medium described herein may further include operations, features, means, or instructions for identifying a scaling factor used for the data transmission using the low coding rate based on the scaling factor of a transmit block size, the scaling factor based on the UE type.

In some examples of the method, apparatuses, and non-transitory computer-readable medium described herein, the first demodulation reference signal (DMRS) transmission may be transmitted during a first time period of the first portion of the slot, and the second DMRS transmission may be transmitted during a second time period of the second portion of the slot, the first time period of the first portion of the slot being different from the second time period of the second portion of the slot.

In some examples of the method, apparatuses, and non-transitory computer-readable medium described herein, receiving the data transmission may include operations, features, means, or instructions for receiving a first transmission of the data transmission and a repetition transmission of the data transmission in a slot.

Some examples of the method, apparatuses, and non-transitory computer-readable medium described herein may further include operations, features, means, or instructions for identifying a DMRS configuration for receiving the first transmission and the repetition transmission in the slot, and receiving the data transmission based on the DMRS configuration.

In some examples of the method, apparatuses, and non-transitory computer-readable medium described herein, the DMRS configuration may include operations, features, means, or instructions for receiving a first DMRS transmission during a first portion of the slot used for the first transmission and a second DMRS transmission during a second portion of the slot used for the repetition transmission.

In some examples of the method, apparatuses, and non-transitory computer-readable medium described herein, the first DMRS transmission may be received during an initial time period of the first portion of the slot, and the second DMRS transmission may be received during the initial time period of the second portion of the slot.

In some examples of the method, apparatuses, and non-transitory computer-readable medium described herein, the first DMRS transmission may be received during a first time period of the first portion of the slot used for the first transmission, and the second DMRS transmission may be received during a second time period of the second portion of the slot used for the repetition transmission, the first time period of the first portion of the slot being different from the second time period of the second portion of the slot.

In some examples of the method, apparatuses, and non-transitory computer-readable medium described herein, the first transmission and the repetition transmission occur during a same symbol configuration or a different symbol configuration in the slot.

Some examples of the method, apparatuses, and non-transitory computer-readable medium described herein may further include operations, features, means, or instructions for identifying, based on a downlink aggregation factor for intra-slot data repetition, a first starting symbol for the first transmission and a second starting symbol for the repetition transmission.

Some examples of the method, apparatuses, and non-transitory computer-readable medium described herein may further include operations, features, means, or instructions for transmitting a feedback signal for the data transmission during a subsequent slot with a time gap for processing based on the slot in which the first transmission and the repetition transmission may be received.

Some examples of the method, apparatuses, and non-transitory computer-readable medium described herein may further include operations, features, means, or instructions for receiving one or more additional repetition transmissions of the data transmission in a second slot occurring after the slot that the first transmission and the repetition transmission may be received in, and transmitting a feedback signal during a subsequent slot with a time gap for processing based on the second slot in which the one or more repetition transmissions may be received.

In some examples of the method, apparatuses, and non-transitory computer-readable medium described herein, receiving the data transmission may include operations, features, means, or instructions for receiving a first portion of the data transmission in a first slot and over a first subband of the supported BWP, and receiving a second portion of the data transmission in a second slot over a second subband of the supported BWP, where the first subband may be a different subband than the second subband.

Some examples of the method, apparatuses, and non-transitory computer-readable medium described herein may further include operations, features, means, or instructions for receiving the first portion of the data transmission and the second portion of the data transmission according to a same time domain configuration or a different time domain configuration between the first slot and the second slot.

In some examples of the method, apparatuses, and non-transitory computer-readable medium described herein, the first subband and the second subband may be in the same BWP or in a different BWP.

Some examples of the method, apparatuses, and non-transitory computer-readable medium described herein may further include operations, features, means, or instructions for determining that the first subband may be in a first BWP and the second subband may be in a second BWP that may be different from the first BWP, and performing a retuning operation during a returning gap between receiving the first portion and receiving the second portion.

In some examples of the method, apparatuses, and non-transitory computer-readable medium described herein, the retuning gap may be a last portion in the first subband in a first BWP, or a first portion in the second subband in a second BWP, or a combination thereof.

Some examples of the method, apparatuses, and non-transitory computer-readable medium described herein may further include operations, features, means, or instructions for receiving the first portion in the first slot and the second portion in the second slot based on a redundancy version (RV) associated with first portion and the second portion of the data transmission.

Some examples of the method, apparatuses, and non-transitory computer-readable medium described herein may further include operations, features, means, or instructions for receiving the data transmission based on a slot index, or a repetition index, or a combination thereof.

A method of wireless communication at a base station is described. The method may include receiving a UE capability message from a UE, the UE capability message including an indication of a UE type, where the UE type is associated with at least one of a reduced bandwidth, or a reduced number of antennas, or a combination thereof for the UE, selecting, based on the UE capability message and a supported bandwidth part of the UE, a resource allocation scheme for a downlink grant for the UE, transmitting the downlink grant for downlink resources for a data transmission to the UE in accordance with the resource allocation scheme, and transmitting the data transmission to the UE based on the downlink grant.

An apparatus for wireless communication at a base station is described. The apparatus may include a processor, memory coupled with the processor, and instructions stored in the memory. The instructions may be executable by the processor to cause the apparatus to receive a UE capability message from a UE, the UE capability message including an indication of a UE type, where the UE type is associated with at least one of a reduced bandwidth, or a reduced number of antennas, or a combination thereof for the UE, select, based on the UE capability message and a supported bandwidth part of the UE, a resource allocation scheme for a downlink grant for the UE, transmit the downlink grant for downlink resources for a data transmission to the UE in accordance with the resource allocation scheme, and transmit the data transmission to the UE based on the downlink grant.

Another apparatus for wireless communication at a base station is described. The apparatus may include means for receiving a UE capability message from a UE, the UE capability message including an indication of a UE type, where the UE type is associated with at least one of a reduced bandwidth, or a reduced number of antennas, or a combination thereof for the UE, selecting, based on the UE capability message and a supported bandwidth part of the UE, a resource allocation scheme for a downlink grant for the UE, transmitting the downlink grant for downlink resources for a data transmission to the UE in accordance with the resource allocation scheme, and transmitting the data transmission to the UE based on the downlink grant.

A non-transitory computer-readable medium storing code for wireless communication at a base station is described. The code may include instructions executable by a processor to receive a UE capability message from a UE, the UE capability message including an indication of a UE type, where the UE type is associated with at least one of a reduced bandwidth, or a reduced number of antennas, or a combination thereof for the UE, select, based on the UE capability message and a supported bandwidth part of the UE, a resource allocation scheme for a downlink grant for the UE, transmit the downlink grant for downlink resources for a data transmission to the UE in accordance with the resource allocation scheme, and transmit the data transmission to the UE based on the downlink grant.

In some examples of the method, apparatuses, and non-transitory computer-readable medium described herein, transmitting the data transmission may include operations, features, means, or instructions for transmitting the data transmission in an interleaved and discontinuous resource block spread over a subset of available subbands in the supported BWP, the subset based on the UE type.

In some examples of the method, apparatuses, and non-transitory computer-readable medium described herein, transmitting the data transmission may include operations, features, means, or instructions for transmitting the data transmission over the supported BWP and using a low coding rate, the low coding rate based on the UE type.

Some examples of the method, apparatuses, and non-transitory computer-readable medium described herein may further include operations, features, means, or instructions for identifying a scaling factor to use for the data transmission using the low coding rate based on the scaling factor of a transmit block size, the scaling factor based on the UE type.

In some examples of the method, apparatuses, and non-transitory computer-readable medium described herein, transmitting the data transmission may include operations, features, means, or instructions for transmitting a first transmission of the data transmission and a repetition transmission of the data transmission in a slot.

Some examples of the method, apparatuses, and non-transitory computer-readable medium described herein may further include operations, features, means, or instructions for identifying a DMRS configuration for transmitting the first transmission and the repetition transmission in the slot, and transmitting the data transmission based on the DMRS configuration.

In some examples of the method, apparatuses, and non-transitory computer-readable medium described herein, the DMRS configuration may include operations, features, means, or instructions for transmitting a first DMRS transmission during a first portion of the slot used for the first transmission and a second DMRS transmission during a second portion of the slot used for the repetition transmission.

In some examples of the method, apparatuses, and non-transitory computer-readable medium described herein, the first DMRS transmission may be transmitted during an initial time period of the first portion of the slot used for the first transmission, and the second DMRS transmission may be transmitted during the initial time period of the second portion of the slot used for the repetition transmission.

In some examples of the method, apparatuses, and non-transitory computer-readable medium described herein, the first transmission and the repetition transmission occur during a same symbol configuration or a different symbol configuration in the slot.

Some examples of the method, apparatuses, and non-transitory computer-readable medium described herein may further include operations, features, means, or instructions for identifying, based on a downlink aggregation factor for intra-slot data repetition, a first starting symbol for the first transmission and a second starting symbol for the repetition transmission.

Some examples of the method, apparatuses, and non-transitory computer-readable medium described herein may further include operations, features, means, or instructions for receiving a feedback signal for the data transmission during a subsequent slot with a time gap for processing based on the slot in which the first transmission and the repetition transmission may be transmitted.

Some examples of the method, apparatuses, and non-transitory computer-readable medium described herein may further include operations, features, means, or instructions for transmitting one or more additional repetition transmissions of the data transmission in a second slot occurring after the slot that the first transmission and the repetition transmission may be transmitted, and receiving a feedback signal during a subsequent slot with a time gap for processing based on the second slot in which the one or more repetition transmissions may be transmitted.

In some examples of the method, apparatuses, and non-transitory computer-readable medium described herein, transmitting the data transmission may include operations, features, means, or instructions for transmitting a first portion of the data transmission in a first slot and over a first subband of the supported BWP, and transmitting a second portion of the data transmission in a second slot over a second subband of the supported BWP, where the first subband may be a different subband than the second subband.

Some examples of the method, apparatuses, and non-transitory computer-readable medium described herein may further include operations, features, means, or instructions for transmitting the first portion of the data transmission and the second portion of the data transmission according to a same time domain configuration or a different time domain configuration between the first slot and the second slot.

In some examples of the method, apparatuses, and non-transitory computer-readable medium described herein, the first subband and the second subband may be in the same BWP or in a different BWP.

Some examples of the method, apparatuses, and non-transitory computer-readable medium described herein may further include operations, features, means, or instructions for determining that the first subband may be in a first BWP and the second subband may be in a second BWP that may be different from the first BWP, and configuring a retuning gap between transmitting the first portion and receiving the second portion.

In some examples of the method, apparatuses, and non-transitory computer-readable medium described herein, the retuning gap includes a last portion in the first subband in a first BWP, or a first portion in the second subband in a second BWP, or a combination thereof.

Some examples of the method, apparatuses, and non-transitory computer-readable medium described herein may further include operations, features, means, or instructions for transmitting the first portion in the first slot and the second portion in the second slot based on a RV associated with first portion and the second portion of the data transmission.

Some examples of the method, apparatuses, and non-transitory computer-readable medium described herein may further include operations, features, means, or instructions for transmitting the data transmission based on a slot index, or a repetition index, or a combination thereof.

DETAILED DESCRIPTION

Figure 1:
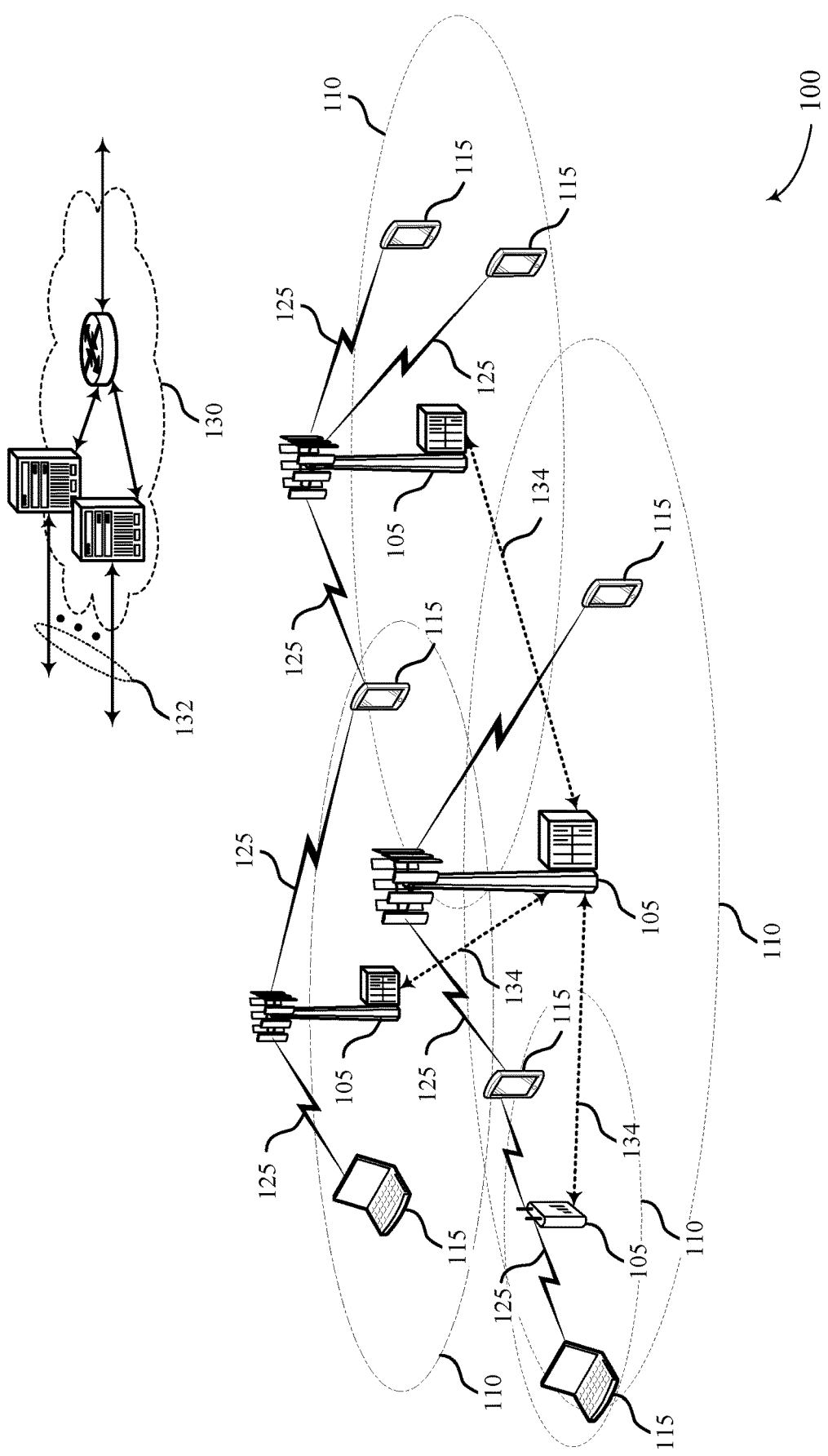
FIG. 1 illustrates an example of a system for wireless communications that supports physical downlink shared channel (PDSCH) resources for reduced capability user equipment (UE) in accordance with aspects of the present disclosure.

Some wireless communication systems use frequency and/or time domain diversity to support increased system performance and throughput. For example, such wireless communication systems may utilize various techniques, alone or in combination, to improve system capacity and performance. Such techniques include, but are not limited to, non-contiguous resource blocks (RBs) within a wide bandwidth part (BWP), distributed resource allocation within a wide BWP, multi-slot aggregation for physical downlink shared channel (PDSCH), and the like. These wireless communication systems typically do not support frequency hopping. However, advances in technology also give rise to user equipment (UE) of a certain UE type that may not be able to use some or all of such advance techniques. For example, some UE types are associated with a limited or reduced bandwidth, low complexity level, low transmit maximum power level, a reduced number of antennas, or an extended battery life. Such UE types may include wearable devices, internet-of-things (IoT) devices, machine-type communication (MTC) devices, and the like.

Aspects of the disclosure are initially described in the context of a wireless communication system. Generally, the described techniques provide for various mechanisms to ensure adequate scheduling for a UE type having a reduced number of antennas, a reduced bandwidth, and the like. For example, the UE type may be associated with, for example, a limited bandwidth, low complexity, low transmit power levels, a fewer number of receive antennas, an extended battery life, and the like. The UE may transmit or otherwise provide a UE capability message carrying or otherwise conveying an indication of the UE type. The UE capability message may be transmitted to a base station in general, although it is to be understood that the UE capability message may be provided to a network entity in some situations (e.g., when the UE is operating in an idle mode).

The UE capability message may be a radio resource control (RRC) layer message that the UE sends to the base station or other network entity, for example during an initial registration process. The UE capability message may detail the capabilities or attributes of the UE and features supported by the UE using a set of defined or standardized information elements or other fields.

Based on the UE type indicated in the UE capability message, the base station and UE both know that the UE type is associated with, for example, reduced bandwidth, reduced number of antennas, low complexity, or low transmit power level. The base station (or network entity when the UE is operating in the idle mode) may select a resource allocation scheme for a downlink grant for the UE according to the UE capability message (e.g., based on the UE type). The base station may transmit the downlink grant identifying or otherwise indicating downlink resources for a downlink transmission to the UE in accordance with the resource allocation scheme. The base station may transmit the data transmission to the UE according to the downlink grant. Although a number of variations of the resource allocation scheme are described below, some aspects may include an interleaved/discontinuous RB spread over a subset of subbands of a BWP, using a low coding rate on a wideband data channel transmission, using intra-slot repetition on a wideband short data channel transmission, using inter-BWP and inter-slot frequency hopping in a narrowband long data channel transmission, and the like. Accordingly, aspects of the described techniques provide various enhancements for the data transmission (e.g., PDSCH) that supports the UE type.

Aspects of the disclosure are further illustrated by and described with reference to apparatus diagrams, system diagrams, and flowcharts that relate to PDSCH resources for reduced capability UE.

FIG. 1 illustrates an example of a wireless communication system 100 that supports PDSCH resources for reduced capability UE in accordance with aspects of the present disclosure. The wireless communication system 100 includes base stations 105, UEs 115, and a core network 130. In some examples, the wireless communication system 100 may be a Long Term Evolution (LTE) network, an LTE-Advanced (LTE-A) network, an LTE-A Pro network, or a New Radio (NR) network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNodeB or gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an IoT device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200\ Ts$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may transmit a UE capability message to a base station 105, the UE capability message including an indication of a UE type, wherein the UE type is associated with at least one of a reduced bandwidth, or a reduced number of antennas, or a combination thereof for the UE 115. The UE 115 may receive, based at least in part on the UE capability message, a downlink grant for downlink resources for a data transmission in accordance with a resource allocation scheme, wherein the resource allocation scheme is associated with the UE type and a supported bandwidth part of the UE 115. The UE 115 may monitor a wireless channel based at least in part on the downlink grant. The UE 115 may receive the data transmission based at least in part on the monitoring of the wireless channel.

Base station 105 may receive a UE capability message from a UE 115, the UE capability message including an indication of a UE type, wherein the UE type is associated with at least one of a reduced bandwidth, or a reduced number of antennas, or a combination thereof for the UE 115. The base station 105 may select, based at least in part on the UE capability message and a supported bandwidth part of the UE, a resource allocation scheme for a downlink grant for the UE 115. The base station 105 may transmit the downlink grant for downlink resources for a data transmission to the UE 115 in accordance with the resource allocation scheme. The base station 105 may transmit the data transmission to the UE 115 based at least in part on the downlink grant.

Although these techniques are described as being performed by a base station 105, it is to be understood that references to the base station 105 performing features in the context of the described techniques may actually be implemented by a base station 105 and/or a network entity, such as an MME. In one example this may include the base station 105 (e.g., gNB) performing the described techniques when the UE 115 is operating in a RRC connected mode and the network entity (e.g., MME) performing the described techniques when the UE 115 is operating in an RRC idle or inactive mode. In another example, the UE 115 may report the capability to network entity (e.g., MME through NAS signaling). The base station 105 performs the features for the UE based on the related information obtained network entity.

Figure 2:
FIG. 2 illustrates a set of example slot configurations that support PDSCH resources for reduced capability UE in accordance with aspects of the present disclosure.
Figure 2:
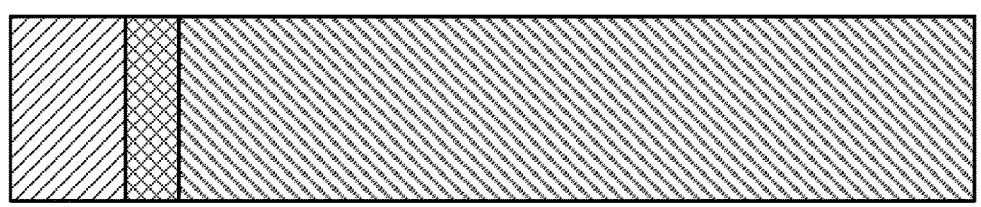
Figure 2:
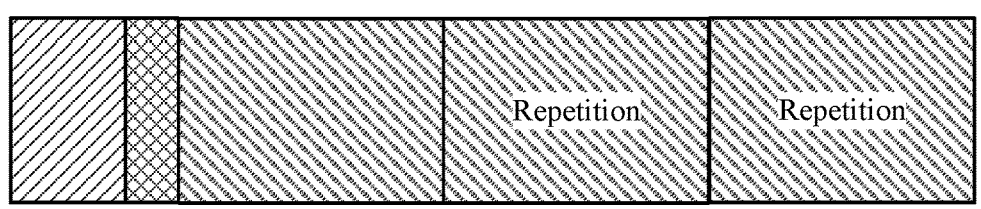
Figure 2:
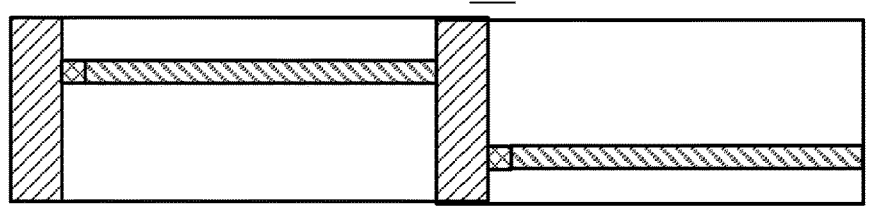
Figure 2:
Figure 2:
Figure 2:
Figure 2:

FIG. 2 illustrates a set of example slot configurations 200 that support PDSCH resources for reduced capability UE in accordance with aspects of the present disclosure. In some examples, the set of example slot configurations 200 may implement aspects of wireless communication system 100. Aspects of the set of example slot configurations 200 may be implemented by a UE, base station, and/or a network entity (e.g., MME), which may be examples of corresponding devices described herein. In particular, aspects of the set of example slot configurations 200 may be implemented by a base station when the UE is operating in an RRC connected mode and/or implemented in a network entity (e.g., MME) when the UE is operating in an RRC inactive or RRC idle mode. Broadly, the set of example slot configurations 200 illustrates four examples of slot configurations for PDSCH enhancements that support a UE type having (or associated with) a reduced capability.

Some wireless communication systems may utilize various diversity techniques to improve system throughput and performance. The diversity techniques may be in the frequency domain, a spatial domain, and/or the time domain. In the frequency domain, this may include configuring non-contiguous RBs within a wide BWP, using a distributed resource allocation within a wide BWP to achieve the frequency diversity over a wide bandwidth. In the time domain, this may include using a multi-slot aggregation for PDSCH. Multi-slot repetition may be on the same symbol allocation spread across an aggregation factor (e.g., pdsch-AggregationFactor {2, 4, or 8}) in consecutive slots, e.g., for combining. However, such techniques may be problematic for certain reduced capability UEs, e.g., certain UE types. For example, some techniques may require wider bandwidth or takes longer transmission time, not be beneficial for power saving of certain UE types. While some UE types support such techniques, other UE types may not (or at least may not fully support).

For example, some UE types may be associated with a reduced or limited bandwidth (e.g., 5 MHz/10 MHz/20 MHz, which may be greater than the SSB bandwidth), a low complexity (e.g., reduced processing capability/requirements, less memory, or fewer transmit/receive chains), a lower maximum transmit power level (e.g., 20 dBm or 14 dBm), a reduced number of antennas (e.g., one or two receive antennas), enhanced power savings/long battery life (e.g., in terms of years), reduced or no mobility, communicating a small amount of data, and the like. Nevertheless, such reduced capability UEs (e.g., UEs having a reduced bandwidth or reduced number of antennas) must still coexist with eMBB, URLLC, or LTE-NB IoT/MTC devices. Accordingly, references to a UE type herein generally refer to these reduced capability UEs.

Accordingly, aspects of the described techniques provide various mechanisms which enhance communications for such UE types (e.g., reduced capability UEs). For example, the UE may transmit or otherwise provide a UE capability message to the base station (and/or to a network entity via a base station) that carries or otherwise conveys an indication of the UE type for the UE. As discussed, the UE type may be associated with, for example, a reduced capability UE having a reduced bandwidth, a reduced number of antennas, low transmit power levels, little or no mobility, enhanced power saving/extended battery life, or small data transmissions. The UE capability message may be provided during initial connection (e.g., using one or more RRC signals, a MAC control element (CE), and the like), or during registration (e.g., using NAS signal to network entity), or afterwards.

The base station (or network entity) may generally select a resource allocation scheme for the UE that can be used to transmit a downlink grant and/or data transmission to the UE according to the UE type. The set of example slot configurations 200 illustrates four non-limiting examples of slot configurations that may be components of a resource allocation scheme selected for the UE in accordance with aspects of the described techniques.

In a first example, the resource allocation scheme may correspond to slot configuration 205. Slot configuration 205 illustrates an example of interleaved/discontinuous RBs being spread across a subset of available subbands in the supported BWP in a distributed resource allocation. Slot configuration 205 may include PDCCH 225 (e.g., the downlink grant for downlink resources) spread across the full BWP. The PDCCH 225 may carry or otherwise convey the indication of downlink resources in accordance with the resource allocation scheme (e.g., in accordance with slot configuration 205). PDCCH 225 may span the first symbol(s) of the slot. During the first symbol(s) following PDCCH 225, the base station may transmit the data transmission by transmitting the DMRS 235, followed by PDSCH 230. Broadly, the data transmission may correspond to PDSCH 230 and the channel estimation for the data transmission is based on the DMRS 235. However, the data transmission may be transmitted using only a subset of the available subbands in the full BWP (e.g., the reduced bandwidth supported by the UE type).

In a second example, the resource allocation scheme may correspond to slot configuration 210. Slot configuration 210 illustrates an example of a data transmission spread over a supported BWP and using a low coding rate, with the low coding rate based on the UE type. Slot configuration 210 may include PDCCH 225 (e.g., the downlink grant for downlink resources) spread across the full BWP. The PDCCH 225 may carry or otherwise convey the indication of downlink resources in accordance with the resource allocation scheme (e.g., in accordance with slot configuration 210). PDCCH 225 may span the first symbol(s) of the slot. During the first symbol(s) following PDCCH 225, the base station may transmit the data transmission by transmitting the DMRS 235, followed by PDSCH 230. Broadly, the data transmission may correspond to PDSCH 230 and the channel estimation for the data transmission is based on the DMRS 235. The data transmission may be transmitted using all of the available subbands in the supported BWP (e.g., the reduced bandwidth supported by the UE type).

In a third example, the resource allocation scheme may correspond to slot configuration 215. Slot configuration 215 illustrates an example of a data transmission spread over a supported BWP and using repetition of the data transmission in the slot, with the repetition rate based on the UE type. Slot configuration 215 may include PDCCH 225 (e.g., the downlink grant for downlink resources) spread across the full BWP. The PDCCH 225 may carry or otherwise convey the indication of downlink resources in accordance with the resource allocation scheme (e.g., in accordance with slot configuration 215). PDCCH 225 may span the first symbol(s) of the slot. During the first symbol(s) following PDCCH 225, the base station may transmit the data transmission by transmitting the DMRS 235, followed by a first transmission of PDSCH 230 and one or more repetitions (with two repetitions being shown by way of example only) of the PDSCH 230 during the slot. Broadly, the data transmission may correspond to PDSCH 230 and the channel estimation for the data transmission is based on the DMRS 235. The data transmission may be transmitted using all of the available subbands in the supported BWP (e.g., the reduced bandwidth supported by the UE type). Accordingly, slot configuration 215 illustrates an example resource allocation using wideband, short PDSCH 230 (e.g., sub-slot based PDSCH with approximately 1-3 symbols in a slot) with intra-slot repetition. The PDSCH 230 repetitions may share the DMRS 235 (as shown in slot configuration 215) or may have an associated intra-slot DMRS for multiple PDSCH repetitions.

In a fourth example, the resource allocation scheme may correspond to slot configuration 220. Slot configuration 220 illustrates an example of a data transmission spread over a narrowband, long PDSCH 230 with inter-/intra-BWPs using inter-slot frequency hopping, based on the UE type. More particularly, slot configuration 220 illustrates an example where a first portion of the data transmission is transmitted in a first slot and over a first subband of the supported BWP and a second portion of the data transmission is transmitted in a second slot over a second subband of the supported BWP, where the first and second subbands are different. In the first slot, slot configuration 220 may include PDCCH 225 (e.g., the downlink grant for downlink resources) spread across the full BWP. The PDCCH 225 may carry or otherwise convey the indication of downlink resources in accordance with the resource allocation scheme (e.g., in accordance with slot configuration 220). PDCCH 225 may span the first symbol(s) of the slot. During the first symbol(s) following PDCCH 225 and on the first subband, the base station may transmit the data transmission by transmitting the DMRS 235, followed by a first transmission (e.g., a first portion of the data transmission) of PDSCH 230 in the first subband. In the second slot, slot configuration 220 may include PDCCH 225 (e.g., the downlink grant for downlink resources) spread across the full BWP. The PDCCH 225 in the second slot may be optional in some examples (e.g., PDCCH 225 in the first slot may schedule the data transmission for the second slot). During the first symbol(s) following PDCCH 225 and on the second subband, the base station may transmit the data transmission by transmitting DMRS 235, followed by a second transmission (e.g., the second portion of the data transmission) of PDSCH 230 in the second subband. Broadly, the data transmission may correspond to PDSCH 230 and DMRS 235 in the first and second slots. The data transmission may be transmitted using a subset of the available subbands in the supported BWP (e.g., the reduced bandwidth supported by the UE type). Accordingly, slot configuration 220 illustrates an example resource allocation scheme using a narrowband/long PDSCH 230 (e.g., slot-based PDSCH) with inter/intra-BWP and inter-slot frequency hopping.

Accordingly, the UE and base station may communicate the downlink grant and the corresponding downlink data transmission scheduled by the downlink grant in accordance to the resource allocation scheme. The resource allocations scheme may correspond to one or more of slot configurations 205, 210, 215, and/or 220.

In some aspects, a PDSCH scrambling sequence may be used. The initialization seed of the scrambling sequence for NR PDSCH may be defined as $c_{init}=n_{RNTI}*2^{15}+q*2^{14}+n_{ID}$, where q is the codeword index, no is the cell ID or sequence ID, and $n_{RNTI}$ is the RNTI associated with the PDSCH. For reduced capability UE types (e.g., NR-Light UEs), the PDSCH repetition using the same scrambling sequence may not be beneficial for interference randomization. Accordingly, aspects of the described techniques may introduce a time-variant initialization seed of the scrambling sequence for reduced capability UE types. The PDSCH repetition/frequency hopping may be defined as $c_{init}=n_{RNTI}*2^{15}+q*2^{14}+n_s*2^{10}+n_{ID}$, wherein $n_s$ is the slot index within a radio frame with a value of {0, . . . , 9}. Or, $n_s$ may refer to the repetition index for the PDSCH repetitions with a value of {0, . . . , 15}.

Figure 3:
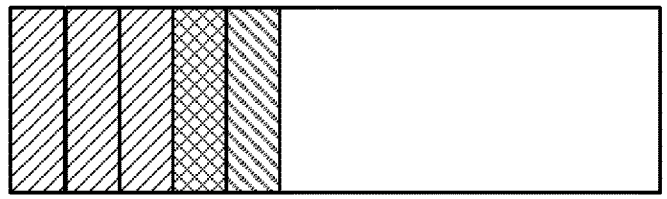
FIG. 3 illustrates a set of example slot configurations that support PDSCH resources for reduced capability UE in accordance with aspects of the present disclosure.
Figure 3:
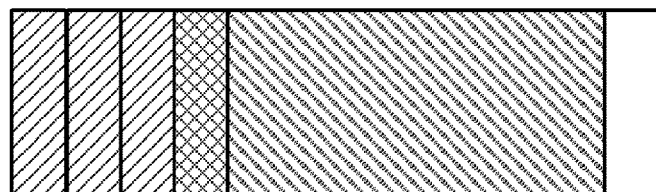
Figure 3:
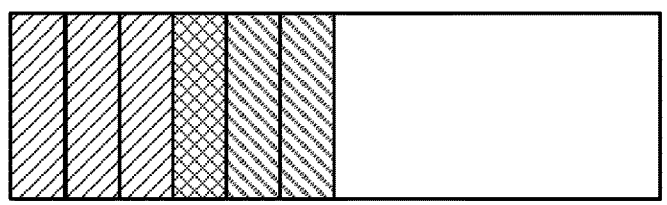
Figure 3:
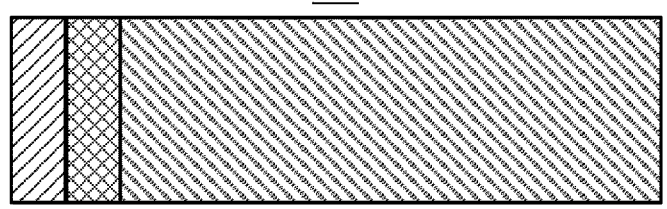
Figure 3:
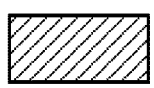
Figure 3:
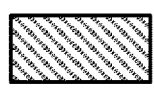
Figure 3:

FIG. 3 illustrates a set of example slot configurations 300 that support PDSCH resources for reduced capability UE in accordance with aspects of the present disclosure. In some examples, the set of example slot configurations 300 may implement aspects of wireless communication system 100 and/or the set of example slot configurations 200. Aspects of the set of example slot configurations 300 may be implemented by a UE, base station, and/or a network entity (e.g., MME), which may be examples of the corresponding devices described herein. In particular, aspects of the set of example slot configurations 300 may be implemented by a base station when a UE is operating in an RRC connected mode and/or implemented in a network entity when the UE is operating in an RRC inactive or RRC idle mode. In another example, the UE may report the capability to the network entity (e.g., MME through NAS signaling). The base station performs the features for the UE based on the related information obtained from the network entity. Broadly, the set of example slot configurations 300 illustrates four examples of slot configurations for PDSCH enhancements that support the UE type having a reduced capability.

As discussed above, some wireless communication systems may utilize various frequency, time, and/or spatial diversity techniques to improve system throughput and performance. While some UE types support such diversity schemes, other UE types may not support all of these techniques. For example, some UE types may be associated with a reduced or limited capability UEs (e.g., reduced bandwidth, fewer antennas, or extended battery life) Accordingly, references to a UE type herein generally refer to these reduced capability UEs.

For example, some reduced capability UE types may be associated with a small downlink packet transmission (e.g., NR-Light UEs). This may include a transport block size (TBS) between 16-100 (e.g., in NR the lowest TBS is 24 and in LTE NB IoT the lowest TBS is 16). Such techniques may include using the lowest MCS (e.g., MCS0) with a modulation order (M) of two for QPSK, a coding rate (R) of 30/1024, and the formula $N_{info}=8*floor(M*R*N_{RB}*12*N_{symbol})/8$ where $N_{symbol}=ceiling(N_{info}/(M*R*N_{RB}*12))$. However, aspects of the described techniques may introduce a TB scaling factor (S) for the data transmission with a lower TBS. The scaling factor may be indicated in the DCI (e.g., the downlink grant), RRC signaling, and the like. The scaling factor may be applied according to the following table:

| Scaling Factor (S) | TBS ($N_{info}$) | Modulation Order (M) | Coding Rate (R × 1024) | RB Number ($N_{RB}$) | Symbol Number ($N_{symbol}$) |
|---|---|---|---|---|---|
| 1 | 16 | 2 | 30 | 24 | 1 |
| 0.5 | 16 | 2 | 30 | 24 | 2 |
| 0.25 | 16 | 2 | 30 | 24 | 4 |
| 0.125 | 16 | 2 | 30 | 24 | 8 |
| 1 | 24 | 2 | 30 | 24 | 2 |
| 0.5 | 24 | 2 | 30 | 24 | 3 |
| 0.25 | 24 | 2 | 30 | 24 | 6 |
| 0.125 | 24 | 2 | 30 | 24 | 12 |

Accordingly, the scaling factor may be set to values of 1, 0.5, 0.25, or 0.125 and $N_{info}=8*floor(M*R*N_{RB}*12*N_{symbol})/8$ changed to $N_{info}=8*floor(S*M*R*N_{RB}*12*N_{symbol})/8$. The equivalent coding rate may then be S*R when applying the scaling factor. Accordingly, aspects of the described techniques may identify the scaling factor used for the data transmission using the low coding rate based at least in part on the scaling factor of the TBS, the scaling factor based at least in part on the UE type.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduced number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signaling to a network entity), or afterwards.

The base station (or network entity) may generally select a resource allocation scheme for the UE that can be used to transmit a downlink grant and/or data transmission to the UE according to the UE type. The set of example slot configurations 300 illustrates four non-limiting examples of slot configurations that may be components of such resource allocation schemes in accordance with aspects of the described techniques. In particular, the set of example slot configurations 300 illustrates two examples where the TBS=16 (e.g., lower TBS supported by a legacy a LTE NB IoT) and another two examples where the TBS=24 (e.g., lowest TBS supported by a legacy NR UE).

In a first example, the resource allocation scheme may correspond to slot configuration 305. Slot configuration 305 illustrates an example where the scaling factor is set to 1 and the TBS is 16. Slot configuration 305 may include PDCCH 325 (e.g., the grant for downlink resources) transmitted in the first three symbols of the slot. The PDCCH 325 may carry or otherwise convey the indication of downlink resources in accordance with the resource allocation scheme (e.g., in accordance with slot configuration 305). During the first symbol following PDCCH 325, the base station may transmit the data transmission by transmitting the DMRS 335 in one symbol, followed by PDSCH 330 in the next symbol. Broadly, the data transmission may correspond to PDSCH 330 and DMRS 335. The data transmission may be transmitted using all available subbands in the full BWP (e.g., the reduced bandwidth supported by the UE type).

In a second example, the resource allocation scheme may correspond to slot configuration 310. Slot configuration 310 illustrates an example where the scaling factor is set to 0.125 and the TBS is 16. Slot configuration 310 may include PDCCH 325 (e.g., the grant for downlink resources) transmitted in the first three symbols of the slot. The PDCCH 325 may carry or otherwise convey the indication of downlink resources in accordance with the resource allocation scheme (e.g., in accordance with slot configuration 310). Starting at the first symbol following PDCCH 325, the base station may transmit the data transmission by transmitting the DMRS 335, followed by PDSCH 330 in the next eight symbols of the slot. Broadly, the data transmission may correspond to PDSCH 330 and DMRS 335. The data transmission may be transmitted using the available subbands in the full BWP (e.g., the reduced bandwidth supported by the UE type).

In a third example, the resource allocation scheme may correspond to slot configuration 315. Slot configuration 315 illustrates an example where the scaling factor is set to 1 and the TBS is 24. Slot configuration 315 may include PDCCH 325 (e.g., the grant for the downlink resources) transmitted in the first three symbols of the slot. The PDCCH 325 may carry or otherwise convey the indication of downlink resources in accordance with the resource allocation scheme (e.g., in accordance with slot configuration 315). During the first symbol following PDCCH 325, the base station may transmit the data transmission by transmitting the DMRS 335, followed by PDSCH 330 in the next two symbols. Broadly, the data transmission may correspond to PDSCH 330 and DMRS 335. The data transmission may be transmitted using the available subbands in the full BWP (e.g., the reduced bandwidth supported by the UE type).

In a fourth example, the resource allocation scheme may correspond to slot configuration 320. Slot configuration 320 illustrates an example where the scaling factor is set to 0.125 and the TBS is 24. Slot configuration 320 may include PDCCH 325 (e.g., the grant for a downlink resources) transmitted in the first symbol of the slot. The PDCCH 325 may carry or otherwise convey the indication of downlink resources in accordance with the resource allocation scheme (e.g., in accordance with slot configuration 320). During the first symbol following PDCCH 325, the base station may transmit the data transmission by transmitting the DMRS 335, followed by PDSCH 330 in the next 12 symbols. Broadly, the data transmission may correspond to PDSCH 330 and DMRS 335. The data transmission may be transmitted using the available subbands in the full BWP (e.g., the reduced bandwidth supported by the UE type).

Accordingly, the UE and base station may communicate the downlink grant, and corresponding downlink data transmission scheduled by the downlink grant, in accordance to the resource allocation scheme. The resource allocations scheme may correspond to one or more of slot configurations 305, 310, 315, and/or 320.

Figure 4:
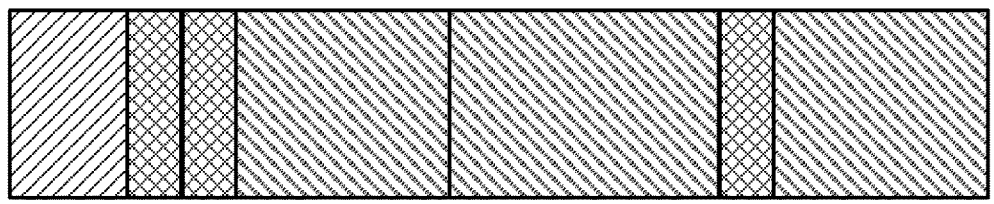
FIG. 4 illustrates a set of example slot configurations that support PDSCH resources for reduced capability UE in accordance with aspects of the present disclosure.
Figure 4:
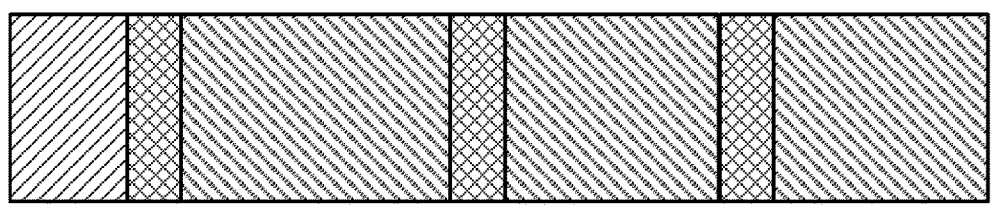
Figure 4:
Figure 4:
Figure 4:

FIG. 4 illustrates a set of example slot configurations 400 that support PDSCH resources for reduced capability UE in accordance with aspects of the present disclosure. In some examples, the set of example slot configurations 400 may implement aspects of wireless communication system 100 and/or the sets of example slot configurations 200 and/or 300. Aspects of the set of example slot configurations 400 may be implemented by a UE, base station, and/or a network entity (e.g., MME), which may be examples of corresponding devices described herein. In particular, aspects of slot configuration 400 may be implemented by a base station when a UE is operating in an RRC connected mode and/or implemented in a network entity when the UE is operating in an RRC inactive or RRC idle mode. In another example, the UE may report the capability to the network entity (e.g., MME through NAS signaling). The base station performs the features for the UE based on the related information obtained from the network entity. Broadly, the set of example slot configurations 400 illustrates two examples of slot configurations for PDSCH enhancements that support the UE type having a reduced capability.

As discussed above, some wireless communication systems may utilize various frequency, time, and/or spatial diversity techniques to improve system throughput and performance. While some UE types support such diversity schemes, other UE types may not support all of these techniques. For example, some UE types may be associated with a reduced or limited capability UEs (e.g., reduced bandwidth, fewer antennas, or extended battery life) Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduced number of antennas, low transmit power levels, little or no mobility, or enhanced power saving/extended battery life. The UE capability message may be provided during initial connection (e.g., using one or more RRC signals, a MAC CE, and the like), or during registration (e.g., using a NAS signal to the network entity), or afterwards.

The base station (or network entity) may generally select a resource allocation scheme for the UE that can be used to transmit a downlink grant and/or data transmission to the UE according to the UE type. In some aspects, the described techniques may support intra-slot PDSCH repetition. In some aspects, this may include DMRS 425 using the same frequency domain resource allocation between slots, which may not overlap with the symbols carrying the PDSCH 420. The DMRS 425 type/symbol positions may be indicated by RRC signaling, DCI (e.g., the downlink grant), and the like. The set of example slot configurations 400 illustrates two non-limiting examples of slot configurations that may be components of such resource allocation schemes in accordance with aspects of the described techniques.

In a first example, the selected resource allocation scheme may correspond to slot configuration 405. Slot configuration 405 illustrates an example where DMRS 425 is per-UE and shared by all the repeated PDSCH 420 in the same slot. Slot configuration 405 may include PDCCH 415 (e.g., the grant for a downlink resources) transmitted in the first symbol(s) of the slot. The PDCCH 415 may carry or otherwise convey the indication of downlink resources in accordance with the resource allocation scheme (e.g., in accordance with slot configuration 405). During the first two symbols following PDCCH 415, the base station may transmit the data transmission by transmitting the DMRS 425, followed by a first transmission of PDSCH 420 and one or more repetitions (with two repetitions being shown by way of example only) of the PDSCH 420 during the slot. Broadly, the data transmission may correspond to PDSCH 420, each repetition of PDSCH 420, and DMRS 425. An additional DMRS 425 transmission may be provided in one or more of the repetitions of PDSCH 420 (with one DMRS 425 being shown in the second repetition by way of example only). The data transmission may be transmitted using all of the available subbands in the supported BWP (e.g., the reduced bandwidth supported by the UE type).

Accordingly, slot configuration 405 illustrates an example resource allocation where the front loaded DMRS 425 is configured, and one (or more) additional DMRS 425 may also be configured. For the small number of PDSCH symbols, some wireless communications may not support the additional DMRS 425. When the UE is configured with intra-slot repetition, additional DMRS 425 may be configured to improve channel estimation. The total number of PDSCH 420 symbol configurations in the intra-slot repetition may be used for reusing the DMRS 425 pattern configuration. DMRS 425 in the same slot may be jointly decoded for channel estimation. Accordingly, slot configuration 405 may support identifying a DMRS configuration for the first transmission and repetition transmission in the slot. Additionally or alternatively, aspects of slot configuration 405 may support the first DMRS 425 during a first portion of the slot (e.g., during the first PDSCH 420 transmission) and a second DMRS transmission during a second portion of the slot (e.g., during the repetition transmission of PDSCH 420).

In a second example, the resource allocation scheme may correspond to slot configuration 410. Slot configuration 410 illustrates an example where DMRS 425 is per-UE, but may not be shared by all the repeated PDSCH 420 in the same slot. Slot configuration 410 may include PDCCH 415 (e.g., the grant for a downlink resources) transmitted in the first symbol(s) of the slot. The PDCCH 415 may carry or otherwise convey the indication of downlink resources in accordance with the resource allocation scheme (e.g., in accordance with slot configuration 410). During the first symbol following PDCCH 415, the base station may transmit the data transmission by transmitting the DMRS 425 during the first symbol, followed by a first transmission of PDSCH 420 and one or more retransmissions (with two retransmissions being shown by way of example only) of the PDSCH 420 during the slot. In slot configuration 410, each repetition of PDSCH 420 is preceded by a DMRS 425, e.g., each transmission/repetition of PDSCH 420 may have its own corresponding DMRS 425 transmission configured. Broadly, the data transmission may correspond to PDSCH 420, each repetition of the PDSCH 420, and DMRS 425. The data transmission may be transmitted using all of the available subbands in the supported BWP (e.g., the reduced bandwidth supported by the UE type).

Accordingly, slot configuration 410 illustrates an example resource allocation scheme where the front loaded DMRS 425 is configured per PDSCH 420 repetition. In some examples, the same DMRS pattern may be reused for PDSCH 420 repetitions, e.g., front-loaded DMRS may be configured per PDSCH 420 repetition. Accordingly, slot configuration 410 may support identifying a DMRS configuration for the first transmission and repetition transmission in the slot. Additionally or alternatively, aspects of slot configuration 410 may support the first DMRS 425 during a first portion of the slot (e.g., during the first PDSCH 420 transmission) and a second DMRS transmission during a second portion of the slot (e.g., during each repetition transmission of PDSCH 420).

Accordingly, the UE and base station may communicate the downlink grant, and corresponding downlink data transmission scheduled by the downlink grant, in accordance to the resource allocation scheme. The resource allocations scheme may correspond to one or more of slot configurations 405, and/or 410.

Figure 5:
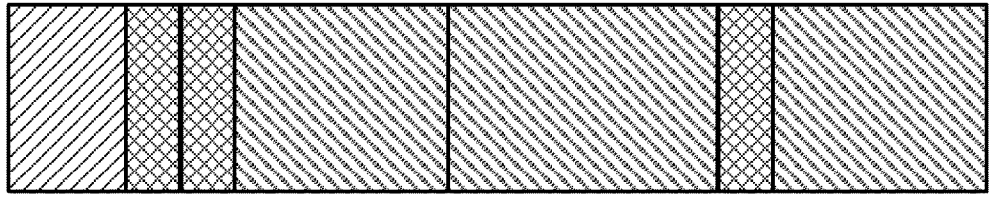
FIG. 5 illustrates a set of example slot configurations that support PDSCH resources for reduced capability UE in accordance with aspects of the present disclosure.
Figure 5:
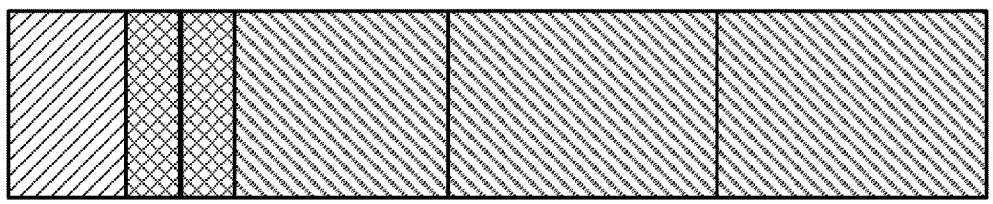
Figure 5:
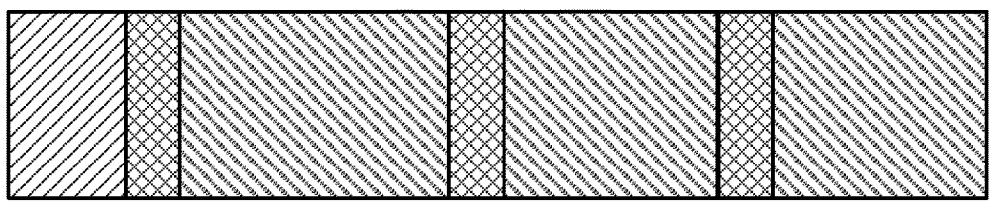
Figure 5:
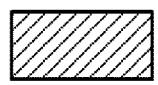
Figure 5:
Figure 5:

FIG. 5 illustrates a set of example slot configurations 500 that support PDSCH resources for reduced capability UE in accordance with aspects of the present disclosure. In some examples, the set of example slot configurations 500 may implement aspects of wireless communication system 100 and/or the sets of example slot configurations 200, 300 and/or 400. Aspects of the set of example slot configurations 500 may be implemented by a UE, base station, and/or a network entity (e.g., MME), which may be examples of the corresponding devices described herein. In particular, aspects of the set of example slot configurations 500 may be implemented by a base station when a UE is operating in an RRC connected mode and/or implemented in a network entity when the UE is operating in an RRC inactive or RRC idle mode. In another example, the UE may report the capability to network entity (e.g., MME through NAS signaling). The base station performs the features for the UE based on the related information obtained from the network entity. Broadly, the set of example slot configurations 500 illustrates three examples of slot configurations for PDSCH enhancements that support the UE type having a reduced capability.

As discussed above, some wireless communication systems may utilize various frequency, time, and/or spatial diversity techniques to improve system throughput and performance. While some UE types support such diversity schemes, other UE types may not support such techniques. For example, some UE types may be associated with a reduced or limited capability UEs (e.g., reduced bandwidth, fewer antennas, or extended battery life) Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduced number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity), or afterwards.

The base station (or network entity) may generally select a resource allocation scheme for the UE that can be used to transmit a downlink grant and/or data transmission to the UE according to the UE type. In some aspects, the described techniques may support intra-slot PDSCH repetition. In some aspects, this may include each PDSCH repetition using the same frequency domain resource allocation in the same linked or number of allocated resources, but may have different starting symbol locations. In some examples, this configuration may be signaled or otherwise indicated by RRC signaling, in the DCI, and the like. The set of example slot configurations 500 illustrates three non-limiting examples of slot configurations that may be components of selected resource allocation schemes in accordance with aspects of the described techniques.

In a first example, the selected resource allocation scheme may correspond to slot configuration 505. Slot configuration 505 illustrates an example where an explicit starting symbol offset is indicated relative to each PDSCH repetition within a slot. This may include avoiding the symbol overlapping with the DMRS symbol. Slot configuration 505 may include PDCCH 520 (e.g., the grant for a downlink resources) transmitted in the first symbol(s) of the slot. The PDCCH 520 may carry or otherwise convey the indication of downlink resources in accordance with the resource allocation scheme (e.g., in accordance with slot configuration 505). During the first two symbols following PDCCH 520, the base station may transmit the data transmission by transmitting the DMRS 530, followed by a first transmission of PDSCH 525 and one or more repetitions (with two repetitions being shown by way of example only) of the PDSCH 525 during the slot. In some examples, one or more of the repetitions of PDSCH 525 may include another transmission of DMRS 530 in the first symbol of the repetition. Broadly, the data transmission may correspond to PDSCH 525, each repetition of PDSCH 525 and DMRS 530. The data transmission may be transmitted using all of the available subbands in the supported BWP (e.g., the reduced bandwidth supported by the UE type). Accordingly, slot configuration 505 illustrates an example resource allocation scheme where the starting symbol offset value relative to each PDSCH 525 repetition within a slot is indicated. DMRS 530 may avoid or otherwise not overlap with the symbols used for transmitting PDSCH 525 and/or one or more repetitions of PDSCH 525. The first transmission of PDSCH 525 and the repetitions of PDSCH 525 in the slot may use the same or different symbol configurations in the slot.

In a second example, the resource allocation scheme may correspond to slot configuration 510. Slot configuration 510 illustrates an example where an implicit starting symbol offset is indicated relative to each PDSCH repetition within a slot. This may include avoiding the data symbols being overlapped with the DMRS symbols. Slot configuration 510 may include PDCCH 520 (e.g., the grant for a downlink resources) transmitted in the first symbol(s) of the slot. The PDCCH 520 may carry or otherwise convey the indication of downlink resources in accordance with the resource allocation scheme (e.g., in accordance with slot configuration 510). During the first two symbols following PDCCH 520, the base station may transmit the data transmission by transmitting the DMRS 530, followed by a first transmission of PDSCH 525 and one or more repetitions (with two repetitions being shown by way of example only) of the PDSCH 525 during the slot. In this example, one or more of the repetitions of PDSCH 525 does not include another transmission of DMRS 530.

Broadly, the data transmission may correspond to PDSCH 525, each repetition of the PDSCH 525, and DMRS 530. The data transmission may be transmitted using all of the available subbands in the supported BWP (e.g., the reduced bandwidth supported by the UE type). Accordingly, slot configuration 510 illustrates an example resource allocation scheme where an implicit indication of the starting symbol is provided by introducing a downlink aggregation factor for the intra-slot PDSCH repetition. The starting symbol per PDSCH repetition may be implicitly indicated by selecting or otherwise using a first starting symbol (S) and the length of the symbol number (L) in the DMRS symbol pattern or configuration. If only front-loaded DMRS is shared by all of the repeated PDSCH 525 repetitions, then S+L*index rep may correspond to the starting symbol per PDSCH 525 repetition. The first transmission of PDSCH 525 and the repetitions of PDSCH 525 in the slot may use the same or a different symbol configuration in the slot. This may include identifying, based on the aggregation factor for intra-slot repetitions, the first starting symbol of the first transmission of PDSCH 525 and a second starting symbol for the repetition transmission of PDSCH 525.

In a third example, the resource allocation scheme may correspond to slot configuration 515. Slot configuration 515 illustrates an example where an implicit starting symbol offset is indicated relative for each PDSCH repetition within a slot. This may include avoiding the data symbols being overlapped with the DMRS symbols. Slot configuration 515 may include PDCCH 520 (e.g., the grant for a downlink resources) transmitted in the first symbol(s) of the slot. The PDCCH 520 may carry or otherwise convey the indication of downlink resources in accordance with the resource allocation scheme (e.g., in accordance with slot configuration 515). During the first symbol following PDCCH 520, the base station may transmit the data transmission by transmitting the DMRS 530, followed by a first transmission of PDSCH 525 and one or more repetitions (with two repetitions being shown by way of example only) of the PDSCH 525 during the slot.

In this example, each repetition of PDSCH 525 includes another transmission of DMRS 530 in the first symbol(s) of the repetition (e.g., front-loaded DMRS). Broadly, the data transmission may correspond to PDSCH 525, each repetition of the PDSCH 525, and each transmission of DMRS 530. The data transmission may be transmitted using all of the available subbands in the supported BWP (e.g., the reduced bandwidth supported by the UE type). Accordingly, slot configuration 515 illustrates an example resource allocation scheme where an implicit indication of the starting symbol is provided by introducing a downlink aggregation factor for the intra-slot PDSCH 525 repetition. The starting symbol per PDSCH repetition may be implicitly indicated by selecting or otherwise using a first starting symbol (S) and the length of the symbol number (L) and the DMRS symbol pattern. If the same DMRS pattern per repeated PDSCH repetition is used (as is shown in slot configuration 515), then S+(L+D)*index rep may correspond to the starting symbol per PDSCH 525 repetition. The DMRS symbols within a slot may be associated and jointly used for channel estimation.

Accordingly, the UE and base station may communicate the downlink grant, and corresponding downlink data transmission scheduled by the downlink grant, in accordance to the resource allocation scheme. The resource allocations scheme may correspond to one or more of slot configurations 505, 510 and/or 515.

Figure 6:
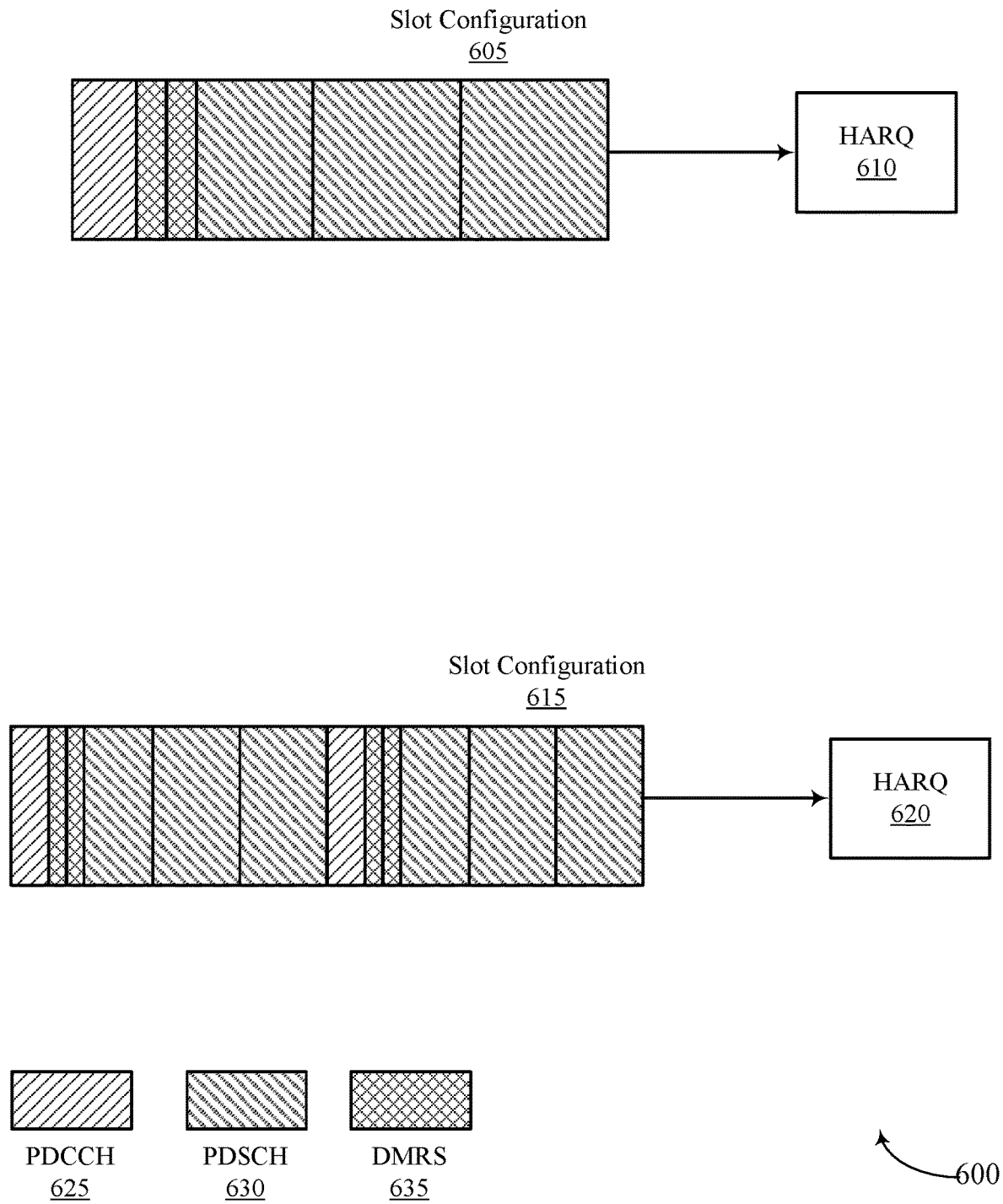
FIG. 6 illustrates a set of example slot configurations that support PDSCH resources for reduced capability UE in accordance with aspects of the present disclosure.

FIG. 6 illustrates a set of example slot configurations 600 that support PDSCH resources for reduced capability UE in accordance with aspects of the present disclosure. In some examples, the set of example slot configurations 600 may implement aspects of wireless communication system 100 and/or sets of example slot configurations 200, 300 400, and/or 500. Aspects of the set of example slot configuration 600 may be implemented by a UE, base station, and/or a network entity (e.g., MME), which may be examples of the corresponding devices described herein. In particular, aspects of the set of example slot configurations 600 may be implemented by a base station when a UE is operating in an RRC connected mode and/or implemented in a network entity when the UE is operating in an RRC inactive or RRC idle mode. In another example, the UE may report the capability to the network entity (e.g., MME through NAS signaling). The base station performs the features for the UE based on the related information obtained from the network entity. Broadly, the set of example slot configurations 600 illustrates two examples of slot configurations for PDSCH enhancements that support a UE type having a reduced capability.

As discussed above, some wireless communication systems may utilize various frequency, time, and/or spatial diversity techniques to improve system throughput and performance. While some UE types support such diversity schemes, other UE types may not support such techniques. For example, some UE types may be associated with a reduced or limited capability UEs (e.g., reduced bandwidth, fewer antennas, or extended battery life) Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduced number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity), or afterwards.

The base station (or network entity) may generally select a resource allocation scheme for the UE that can be used to transmit a downlink grant and/or data transmission to the UE according to the UE type. In some aspects, the described techniques may support inter- and/or intra-slot PDSCH repetition. In some aspects, this may include each PDSCH repetition using the same frequency domain resource allocation. The set of example slot configurations 600 illustrates two non-limiting examples of slot configurations that may be components of such resource allocation schemes in accordance with aspects of the described techniques.

In a first example, the resource allocation scheme may correspond to slot configuration 605. Slot configuration 605 illustrates an example where, when intra-slot repetition is configured, the UE may report its HARQ-ACK information after a last PDSCH of the aggregated PDSCH (e.g., the initial PDSCH transmission and each repetition) in the same slot. This may avoid the requirement for a short processing time by the UE. Slot configuration 605 may include PDCCH 625 (e.g., the grant for a downlink resources) transmitted in the first symbol(s) of the slot. The PDCCH 625 may carry or otherwise convey the indication of downlink resources in accordance with the resource allocation scheme (e.g., in accordance with slot configuration 605). During the first two symbols following PDCCH 625, the base station may transmit the data transmission by transmitting the DMRS 635, followed by a first transmission of PDSCH 630 and one or more repetitions (with two repetitions being shown by way of example only) of the PDSCH 630 during the slot. The UE may then transmit its HARQ 610 in a subsequent slot. The data transmission may correspond to PDSCH 630, each repetition of PDSCH 630, and DMRS 635. The data transmission may be transmitted using all of the available sub-bands in the supported BWP (e.g., the reduced bandwidth supported by the UE type). Accordingly, slot configuration 605 illustrates an example resource allocation scheme where the UE can report its HARQ-ACK information (e.g., HARQ 610) after the last PDSCH 630 transmission or repetition. If the UE can detect the PDSCH 630 with early termination (e.g., recover the data from the first PDSCH 630 transmission or using one of the earlier repetitions), the HARQ 610 timing may be counted from the end of the last PDSCH 630 repetition in the last slot of the aggregated PDSCHs. Accordingly, the UE may transmit a feedback signal (e.g., HARQ 610) for the data transmission during a subsequent slot. The subsequent slot may be configured to have a time gap for processing and may be based on the slot in which the first PDSCH 630 and repetition PDSCH 630 transmissions are performed.

In a second example, the resource allocation scheme may correspond to slot configuration 615. Slot configuration 615 illustrates an example where, when inter-slot repetition is configured in addition to the inter-slot repetition, the UE may report its HARQ-ACK information after a last PDSCH in the last slot of the aggregated PDSCH (e.g., the initial PDSCH transmission and each repetition). This may avoid the requirement for a short processing time by the UE. Slot configuration 615 may include, in the first slot, PDCCH 625 (e.g., the grant for a downlink resources) transmitted in the first symbol(s) of the first slot. The PDCCH 625 may carry or otherwise convey the indication of downlink resources in accordance with the resource allocation scheme (e.g., in accordance with slot configuration 615). During the first two symbols following PDCCH 625 in the first slot, the base station may transmit the data transmission by transmitting the DMRS 635, followed by a first transmission of PDSCH 630 and one or more repetitions (with two repetitions being shown by way of example only) of the PDSCH 630 during the first slot. Slot configuration 615 may include, in the second slot, PDCCH 625 (e.g., the grant for a downlink resources) optionally being transmitted in the first symbol(s)

of the second slot (e.g., the PDCCH 625 transmitted in the first slot may schedule the data transmission in the second slot). The PDCCH 625, if transmitted in the second slot, may carry or otherwise convey the indication of downlink resources in accordance with the resource allocation scheme (e.g., in accordance with slot configuration 615). During the first two symbols of the second slot following PDCCH 625, the base station may transmit the data transmission by transmitting the DMRS 635, followed by a first transmission of PDSCH 630 and one or more repetitions (with two repetitions being shown by way of example only) of the PDSCH 630 during the second slot. The UE may then transmit its HARQ 620 in a subsequent slot. The data transmission may correspond to the aggregate PDSCH 630 transmissions, each repetition of the PDSCH 630, and DMRS 635. The data transmission may be transmitted using all of the available subbands in the supported BWP (e.g., the reduced bandwidth supported by the UE type).

Accordingly, slot configuration 615 illustrates an example resource allocation scheme where the UE can report its HARQ-ACK information (e.g., HARQ 610) after the last PDSCH 630 transmission in the last slot of the aggregated PDSCHs. If the UE can detect the PDSCH 630 with early termination (e.g., recover the data from the first PDSCH 630 transmission or one of the early repetitions), the HARQ 620 timing may be counted from the end of the last PDSCH 630 repetition in the last slot of the aggregated PDSCHs. Accordingly, slot configuration 615 may support one or more additional repetition transmissions of the data transmission in a second slot and the feedback signal (e.g., HARQ 620) provided during a subsequent slot with a time gap for processing by the UE and based on the second slot in which the repetition transmission occurs.

Accordingly, the UE and base station may communicate the downlink grant, and corresponding downlink data transmission scheduled by the downlink grant, in accordance with the resource allocation scheme. The resource allocations scheme may correspond to one or more of slot configurations 605 and/or 610.

Figure 7:
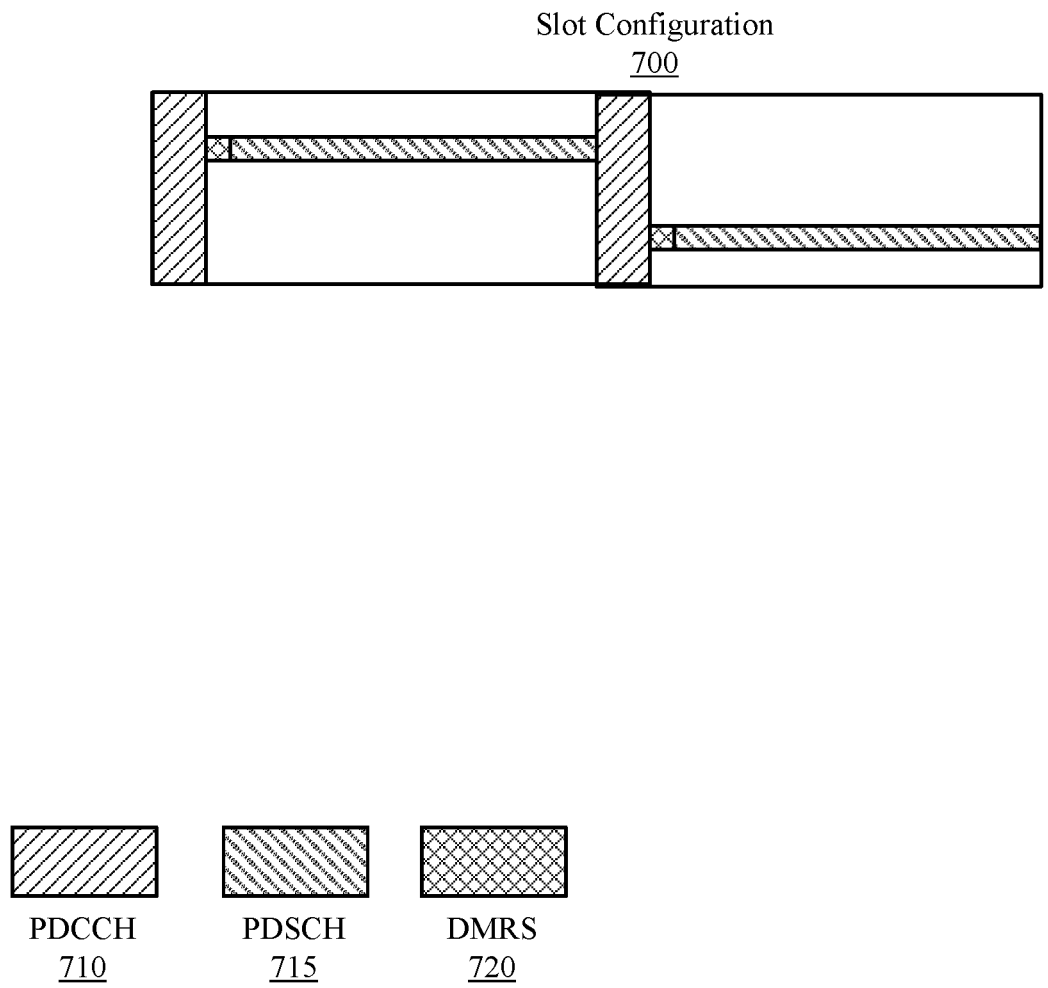
FIG. 7 illustrates an example of a slot configuration that supports PDSCH resources for reduced capability UE in accordance with aspects of the present disclosure.

FIG. 7 illustrates an example of a slot configuration 700 that supports PDSCH resources for reduced capability UE in accordance with aspects of the present disclosure. In some examples, slot configuration 700 may implement aspects of wireless communication system 100 and/or sets of example slot configurations 200, 300 400, 500 and/or 600. Aspects of slot configuration 700 may be implemented by a UE, base station, and/or a network entity (e.g., MME), which may be examples of the corresponding devices described herein. In particular, aspects of slot configuration 700 may be implemented by a base station when a UE is operating in an RRC connected mode and/or implemented in a network entity when the UE is operating in an RRC inactive or RRC idle mode. In another example, the UE may report the capability to the network entity (e.g., MME through NAS signaling). The base station performs the features for the UE based on the related information obtained from the network entity. Broadly, slot configuration 700 illustrates one example of a slot configuration for PDSCH enhancements that support a UE type having a reduced capability.

As discussed above, some wireless communication systems may utilize various frequency, time, and/or spatial diversity techniques to improve system throughput and performance. While some UE types support such diversity schemes, other UE types may not these techniques. For example, some UE types may be associated with a reduced or limited capability UEs (e.g., reduced bandwidth, fewer antennas, or extended battery life) Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduced number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity), and the like.

The base station (or network entity) may generally select a resource allocation scheme for the UE that can be used to transmit a downlink grant and/or data transmission to the UE according to the UE type. In some aspects, the described techniques may support inter- and/or intra-slot PDSCH repetition. In some aspects, this may include each PDSCH repetition using different frequency domain resource allocations in different slots. Slot configuration 700 illustrates one non-limiting example of such a resource allocation scheme in accordance with aspects of the described techniques.

Slot configuration 700 illustrates an example where each PDSCH repetition may occur in different slots and may use the same time domain resource allocation, but use a different frequency domain location in accordance with frequency hopping patterns. Slot configuration 700 illustrates an example for intra-BWP frequency hopping is configured per-BWP, which may support or otherwise allow a different or the same frequency hopping patterns to be used in a different BWP. The frequency hopping patterns may be carried or otherwise conveyed in RRC signaling, a DCI, and the like.

Slot configuration 700 may include PDCCH 710 (e.g., the grant for a downlink resources) transmitted in the first symbol(s) of the first slot. The PDCCH 710 may carry or otherwise convey the indication of downlink resources in accordance with the resource allocation scheme (e.g., in accordance with slot configuration 700). During the first symbol following PDCCH 710 in the first slot, the base station may transmit the data transmission by transmitting the DMRS 720, followed by the transmission of PDSCH 715. Slot configuration 700 may optionally include PDCCH 710 transmitted in the first symbol(s) of the second slot (e.g., the PDCCH 710 transmitted in the first slot may schedule the data transmission in the second slot). When transmitted, the PDCCH 710 may carry or otherwise convey the indication of downlink resources in accordance with the resource allocation scheme (e.g., in accordance with slot configuration 700). During the first symbol following PDCCH 710 in the second slot, the base station may transmit the data transmission by transmitting the DMRS 720, followed by a repetition transmission of PDSCH 715. The data transmission may correspond to PDSCH 715, each repetition of PDSCH 715, and DMRS 720. The data transmission may be transmitted using a subset of the available subbands in the supported BWP (e.g., the reduced bandwidth supported by the UE type), with frequency hopping occurring for different slots.

Accordingly, slot configuration 700 illustrates an example resource allocation scheme where the downlink aggregation level per hop may be based, at least in some aspects, on the bundling size. This may also include a RB offset indication being provided. The frequency hopping may lead to a wraparound situation (e.g., the starting RB an ending RB may be at the two edges of the supported BWP). In some aspects, the timing location may be the same relative to the slot boundary for each slot.

Accordingly, the UE and base station may communicate the downlink grant, and corresponding downlink data transmission scheduled by the downlink grant, in accordance to the resource allocation scheme. The resource allocations scheme may correspond to slot configuration 700.

Figure 8:
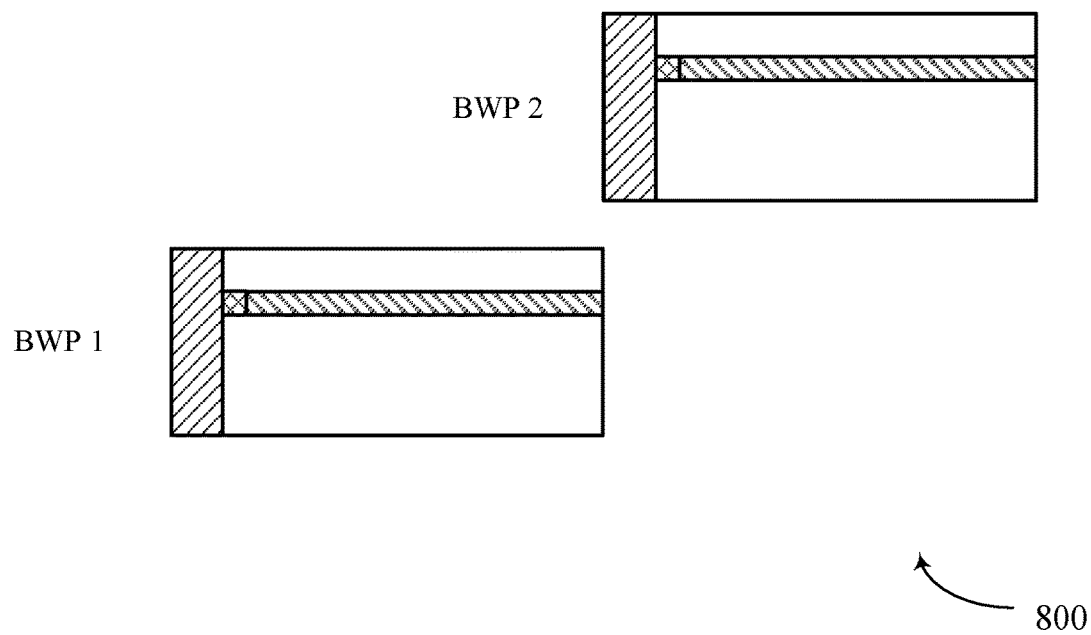
FIG. 8 illustrates a set of example slot configurations that support PDSCH resources for reduced capability UE in accordance with aspects of the present disclosure.
Figure 8:

FIG. 8 illustrates a set of example slot configurations 800 that support PDSCH resources for reduced capability UE in accordance with aspects of the present disclosure. In some examples, the set of example slot configurations 800 may implement aspects of wireless communication system 100 and/or sets of example slot configurations 200, 300 400, 500, 600, and/or slot configuration 700. Aspects of the set of example slot configurations 800 may be implemented by a UE, base station, and/or a network entity (e.g., MME), which may be examples of the corresponding devices described herein. In particular, aspects of the set of example slot configurations 800 may be implemented by a base station when the UE is operating in an RRC connected mode and/or implemented in a network entity when the UE is operating in an RRC inactive or RRC idle mode. Broadly, the set of example slot configurations 800 illustrates possible slot configurations for PDSCH enhancements that support a UE type having a reduced capability.

As discussed above, some wireless communication systems may utilize various frequency, time, and/or spatial diversity techniques to improve system throughput and performance. While some UE types support such diversity schemes, other UE types may not support all of such techniques. For example, some UE types may be associated with a reduced or limited capability UEs (e.g., reduced bandwidth, fewer antennas, or extended battery life). Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduced number of antennas, low transmit power levels, little or no mobility, enhanced power saving/extended battery life. The UE capability message may be provided during initial connection (e.g., using one or more RRC signals, a MAC CE, and the like), or during registration (e.g., using NAS signal to network entity), and the like.

The base station (or network entity) may generally select a resource allocation scheme for the UE that can be used to transmit a downlink grant and/or data transmission to the UE according to the UE type. In some aspects, the described techniques may support inter- and/or intra-slot PDSCH repetition. In some aspects, this may include each PDSCH repetition using different frequency domain resource allocations in different slots. The set of example slot configurations 800 illustrate non-limiting examples of slot configurations that may be components of such a resource allocation scheme in accordance with aspects of the described techniques.

In one example, the selected resource allocation scheme may correspond to slot configuration 805. Slot configuration 805 illustrates an example where each PDSCH repetition may occur in different slots and may use the same time domain resource allocation, but use a different frequency domain location in different BWPs in accordance with frequency hopping patterns. Slot configuration 805 illustrates an example where inter-BWP frequency hopping is configured per-BWP, which may support or otherwise allow a different or the same frequency hopping patterns to be used in the different BWPs. The frequency hopping patterns may be carried or otherwise conveyed in RRC signaling, a DCI, and the like.

Slot configuration 805 may include PDCCH 810 (e.g., the grant for a downlink resources) transmitted in the first symbol(s) of the first slot and in a first BWP (e.g., BWP 1). The PDCCH 810 may carry or otherwise convey the indication of downlink resources in accordance with the resource allocation scheme (e.g., in accordance with slot configuration 805). During the first symbol following PDCCH 810 in the first slot and in the first BWP, the base station may transmit the data transmission by transmitting the DMRS 820, followed by the transmission of PDSCH 815. Slot configuration 805 may optionally include PDCCH 810 transmitted in the first symbol(s) of the second slot (e.g., the PDCCH 810 transmitted in the first slot may schedule the data transmission in the second slot) and in the second BWP (e.g., BWP 2). When transmitted, the PDCCH 810 may carry or otherwise convey the indication of downlink resources in accordance with the resource allocation scheme (e.g., in accordance with slot configuration 805). During the first symbol following PDCCH 810 in the second slot and in the second BWP, the base station may transmit the data transmission by transmitting the DMRS 820, followed by a repetition transmission of PDSCH 815. The data transmission may correspond to PDSCH 815, each repetition of PDSCH 815, and DMRS 820. The data transmission may be transmitted using a subset of the available subbands in the first and second BWPs (e.g., the reduced bandwidth supported by the UE type), with frequency hopping occurring for different slots and in different BWPs. Accordingly, slot configuration 805 illustrates an example resource allocation scheme where the downlink aggregation level per hop may be based, at least in some aspects, on the bundling size.

In some examples, slot configuration 805 may include a narrowband BWP offset indication (or BWP index sequence) for inter-BWP frequency hopping being provided. A NR Light UE may be configured with more than one downlink BWP, with the total bandwidth size no larger than the maximum bandwidth supported by the UE. Slot configuration 805 may keep the same relative resource block location within the downlink BWP after the frequency hopping. In some examples, slot configuration 805 may support a floating narrowband BWP with a predefined hopping pattern. For example, a NR Light UE may be configured with a downlink BWP with the size no larger than the maximum supported bandwidth of the UE. The center frequency for the downlink BWP may be changed based on the frequency hopping pattern. In some examples, the time location may be the same relative to the slot boundary for each slot.

Accordingly, the UE and base station may communicate the downlink grant, and corresponding downlink data transmission scheduled by the downlink grant, in accordance to the resource allocation scheme. The resource allocations scheme may correspond to slot configuration 805.

Figure 9:
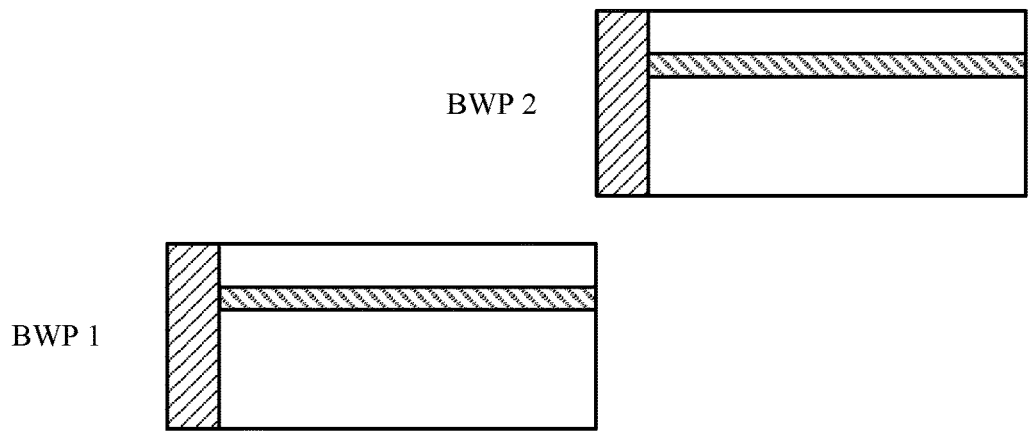
FIG. 9 illustrates a set of example slot configurations that support PDSCH resources for reduced capability UE in accordance with aspects of the present disclosure.
Figure 9:
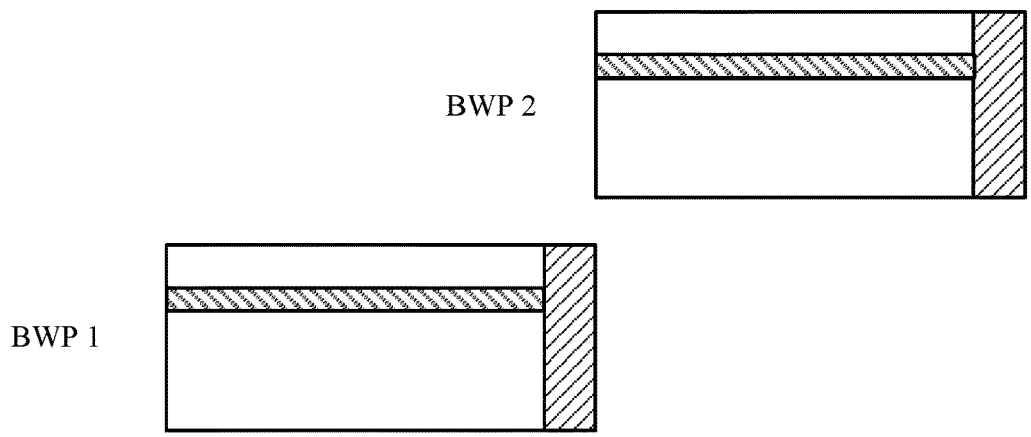
Figure 9:
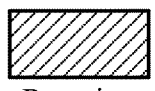
Figure 9:

FIG. 9 illustrates a set of example slot configurations 900 that support PDSCH resources for reduced capability UE in accordance with aspects of the present disclosure. In some examples, the set of example slot configurations 900 may implement aspects of wireless communication system 100 and/or sets of example slot configurations 200, 300 400, 500 600, and/or 800, and or example slot configuration 700. Aspects of the set of example slot configurations 900 may be implemented by a UE, base station, and/or a network entity (e.g., MME), which may be examples of the corresponding devices described herein. In particular, aspects of the set of example slot configurations 900 may be implemented by a base station when the UE is operating in an RRC connected mode and/or implemented in a network entity when the UE is operating in an RRC inactive or RRC idle mode. In another example, the UE may report the capability to the network entity (e.g., MME through NAS signaling). The base station performs the features for the UE based on the related information obtained from the network entity. Broadly, the set of example slot configurations 900 illustrates two examples of slot configurations for PDSCH enhancements that support a UE type having a reduced capability.

As discussed above, some wireless communication systems may utilize various frequency, time, and/or spatial diversity techniques to improve system throughput and performance. While some UE types support such diversity schemes, other UE types may not. For example, some UE types may be associated with a reduced or limited capability UEs (e.g., reduced bandwidth, fewer antennas, or extended battery life). Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduced number of antennas, low transmit power levels, little or no mobility, or enhanced power saving/extended battery life. the UE capability message may be provided during initial connection (e.g., using one or more RRC signals, a MAC CE, and the like), or during registration (e.g., using NAS signal to network entity), and the like.

The base station (or network entity) may generally select a resource allocation scheme for the UE that can be used to transmit a downlink grant and/or data transmission to the UE according to the UE type. In some aspects, the described techniques may support inter- and/or intra-slot PDSCH repetition. In some aspects, this may include each PDSCH repetition using different frequency domain resource allocations in different slots. This set of example slot configurations 900 illustrates two non-limiting examples of slot configurations that may be components of such resource allocation schemes in accordance with aspects of the described techniques.

In a first example, the selected resource allocation scheme may correspond to slot configuration 905. Slot configuration 905 illustrates an example where each PDSCH repetition may occur in different slots and may use the same time domain resource allocation, but use a different frequency domain location in different BWPs in accordance with frequency hopping patterns. Slot configuration 905 illustrates an example where inter-BWP frequency hopping is configured per-BWP, which may support or otherwise allow a different or the same frequency hopping pattern to be used in the different BWPs. An indication of the frequency hopping patterns may be carried or otherwise conveyed in RRC signaling, a DCI, and the like. Slot configuration 905 further illustrates an example where a retuning gap is provided in the downlink. The radio frequency (RF) retuning may be due to the frequency hopping (e.g., if needed for the inter-BWP frequency hopping, or a dual connectivity (DC) change). The retuning gap (e.g., a guard period) for RF retuning may be configured in two (or more) options. Slot configuration 905 illustrates a first example where the symbols at the beginning of the slot after frequency hopping, e.g., the symbols typically reserved for downlink control information (e.g., PDCCH), are used as the retuning gap. The symbols typically allocated for the downlink control information in this example may be used for the retuning gap unless the control information is located with the retuning gap region. Accordingly, the UE may not be expected to monitor/send signals during the retuning gap during the frequency hopping.

Accordingly, slot configuration 905 may include retuning gap 910 in the first symbol(s) of the first slot and in a first BWP (e.g., BWP 1). The retuning gap 910 may be used by the UE to retune to the subband that the data transmission is scheduled on. Following retuning gap 910 in the first slot and in the first BWP, the base station may transmit the data transmission by transmitting PDSCH 915 in a first subband and in the first BWP. Slot configuration 905 may include retuning gap 910 transmitted in the first symbol(s) of the second slot and in the second BWP. During the first symbol following the retuning gap 910 in the second slot and in the second BWP (e.g., BWP 2), the base station may transmit the data transmission by transmitting a repetition transmission of PDSCH 915. The data transmission may correspond to PDSCH 915 and any repetition transmission of PDSCH 915. The data transmission may be transmitted using a subset of the available subbands in the first and second BWPs (e.g., the reduced bandwidth supported by the UE type), with frequency hopping occurring for different slots and in different BWPs.

In a second example, the resource allocation scheme may correspond to slot configuration 920. Slot configuration 920 illustrates an example where each PDSCH repetition may occur in different slots and may use the same time domain resource allocation, but use a different frequency domain location in different BWPs in accordance with frequency hopping patterns. Slot configuration 920 illustrates an example where inter-BWP frequency hopping is configured per-BWP, which may support or otherwise allow a different or the same frequency hopping pattern to be used in the different BWPs. An indication of the frequency hopping patterns may be carried or otherwise conveyed in RRC signaling, a DCI, and the like. Slot configuration 920 further illustrates an example where a retuning gap is provided in the downlink. The RF retuning gap may be due to the frequency hopping (e.g., if needed for the inter-BWP frequency hopping, or a DC change). The retuning gap (e.g., a guard period) for RF retuning may be configured as two (or more) options. Slot configuration 920 illustrates a second example where the symbols are at the end of the slot after frequency hopping, e.g., the symbols typically reserved for uplink control information (e.g., PUCCH). The symbols typically allocated for the uplink control information in this example may be used for the retuning gap unless the control information is located within the retuning gap region. Accordingly, the UE may not be expected to monitor/send signals during the retuning gap during the frequency hopping.

Accordingly, slot configuration 920 may begin with the data transmission (e.g., PDSCH 915) occurring first in the first slot, using the first subband, and in the first BWP. Slot configuration 920 may include retuning gap 910 in the last symbol(s) of the first slot and in the first BWP (e.g., BWP 1). The retuning gap 910 may be used by the UE to retune to the subband that the data transmission is scheduled on in the second slot. Following retuning gap 910 in the first slot and in the first BWP, the base station may transmit the data transmission by performing the repetition transmission of PDSCH 915 in a second subband and in the second BWP (e.g., BWP 2). Slot configuration 920 may include retuning gap 910 in the last symbol(s) of the second slot and in the second BWP. The data transmission may correspond to PDSCH 915 and any repetition transmission of PDSCH 915. The data transmission may be transmitted using a subset of the available subbands in the first and second BWPs (e.g., the reduced bandwidth supported by the UE type), with frequency hopping occurring for different slots and in different BWPs. The symbols at the end of the slot occurring before frequency hopping (e.g., the symbols typically reserved for uplink control information) may be repurposed for the retuning gap 910.

Accordingly, the UE and base station may communicate the downlink grant, and corresponding downlink data transmission scheduled by the downlink grant, in accordance to the resource allocation scheme. The resource allocations scheme may correspond to one or more of slot configuration 905 and/or 920.

Figure 10:
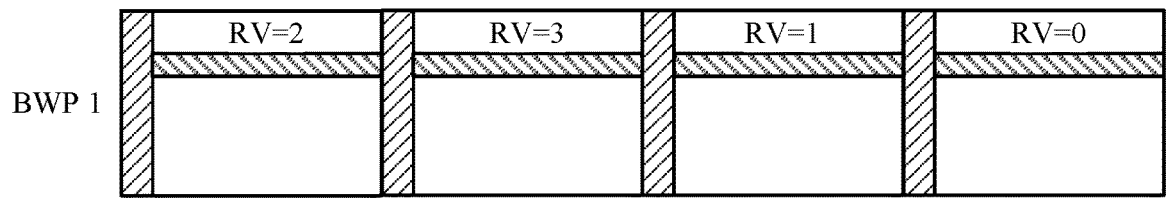
FIG. 10 illustrates a set of example slot configurations that support PDSCH resources for reduced capability UE in accordance with aspects of the present disclosure.
Figure 10:
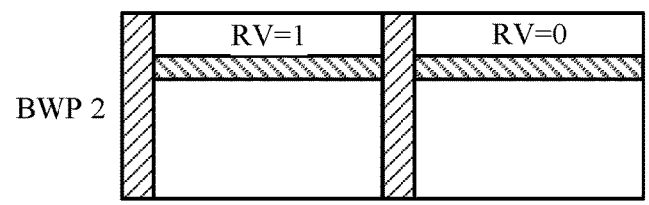
Figure 10:
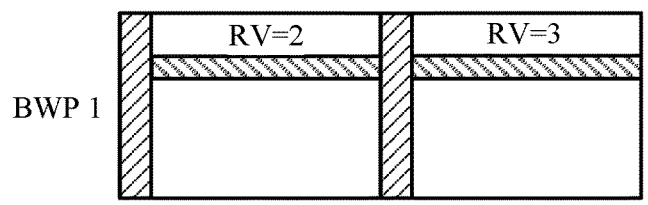
Figure 10:
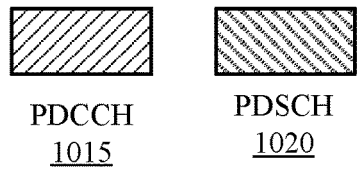

FIG. 10 illustrates a set of example slot configurations 1000 that support PDSCH resources for reduced capability UE in accordance with aspects of the present disclosure. In some examples, the set of example slot configurations 1000 may implement aspects of wireless communication system 100 and/or sets of example slot configurations 200, 300 400, 500 600, 800 and/or 900, and/or example slot configuration 700. Aspects of the set of example slot configurations 1000 may be implemented by a UE, base station, and/or a network entity (e.g., MME), which may be examples of the corresponding devices described herein. In particular, aspects of the set of example slot configurations 1000 may be implemented by a base station when the UE is operating in an RRC connected mode and/or implemented in a network entity when the UE is operating in an RRC inactive or RRC idle mode. Broadly, the set of example slot configurations 1000 illustrates two examples of a slot configuration for PDSCH enhancements that support a UE type having a reduced capability.

As discussed above, some wireless communication systems may utilize various frequency, time, and/or spatial diversity techniques to improve system throughput and performance. While some UE types support such diversity schemes, other UE types may not. For example, some UE types may be associated with a reduced or limited capability UEs (e.g., reduced bandwidth, fewer antennas, or extended battery life). Accordingly, references to a UE type herein generally refer to these reduced capability UEs.

Accordingly, aspects of the described techniques provide various mechanisms which enhance communications for such UE types (e.g., reduced capability UE types). For example, the UE may transmit or otherwise provide a UE capability message to the base station (or to a network entity via a base station) that carries or otherwise conveys an indication of the UE type for the UE. As discussed, the UE type may be associated with, for example, a reduced capability UE having a reduced bandwidth, reduced number of antennas, low transmit power levels, little or no mobility, or enhanced power saving/extended battery life. The UE capability message may be provided during initial connection (e.g., using one or more RRC signals, a MAC CE, and the like), or during registration (e.g., using NAS signal to network entity).

The base station (or network entity) may generally select a resource allocation scheme for the UE that can be used to transmit a downlink grant and/or data transmission to the UE according to the UE type. In some aspects, the described techniques may support inter- and/or intra-slot PDSCH repetition. In some aspects, this may include each PDSCH repetition using different frequency domain resource allocations in different slots. The set of example slot configurations 1000 illustrates two non-limiting examples of slot configurations that may be components of such resource allocation schemes in accordance with aspects of the described techniques.

In a first example, the resource allocation scheme may correspond to slot configuration 1005. Slot configuration 1005 illustrates an example where each PDSCH repetition may occur in different slots and may use the same or different time domain resource allocations between slots, may use the same or different frequency domain location between slots, and in the same BWP in accordance with frequency hopping patterns. Slot configuration 1005 illustrates an example where inter-slot repetition and inter-BWP frequency hopping is configured per-BWP, which may support or otherwise allow a different or the same frequency hopping pattern to be used in the different BWP. An indication of the frequency hopping patterns may be carried or otherwise conveyed in RRC signaling, a DCI, and the like. Slot configuration 1005 further illustrates an example including PDSCH repetition/aggregation and frequency hopping. One DCI may be used to schedule the multi-slot PDSCH frequency hopping. A redundancy version (RV) repetition may be used with a predefined order being applied to the same frequency hop and/or to different frequency hops. The RRC configured downlink aggregation factor for the multi-slot repetition can be used in addition to the frequency hopping. The RV pattern may be repeated throughout the four slots, e.g., RV2, RV3, RV1, and RV0, or some other pattern.

Accordingly, slot configuration 1005 may begin with the base station transmitting PDCCH 1015 in the first symbol(s) of the first slot and in a first BWP (e.g., BWP 1). The PDCCH 1015 may carry or otherwise convey an indication of the downlink grant (e.g., DCI) scheduling the data transmission (e.g., PDSCH 1020). The PDCCH 1015 may be transmitted in the full BWP. The base station may then perform the data transmission by transmitting PDSCH 1020 in the remaining symbol(s) of the first slot. In the second slot, the base station may again transmit the PDCCH 1015 in the first symbol(s) of the second slot, followed by a repetition transmission of PDSCH 1020 in the remaining symbol(s) of the second slot and in the first BWP. In the third slot, the base station may again transmit the PDCCH 1015 in the first symbol(s) of the third slot, followed by a repetition transmission of PDSCH 1020 in the remaining symbol(s) of the third slot. In the fourth slot, the base station may again transmit the PDCCH 1015 in the first symbol(s) of the fourth slot, followed by a repetition transmission of PDSCH 1020 in the remaining symbol(s) of the fourth slot. The PDSCH 1020 transmissions in each of the four slots may use the same frequency domain resource allocation (e.g., on the same subband). That is, slot bundling/aggregation techniques may be used in each frequency hop and may be repeated in the same frequency location before the frequency hop. In some examples, a DMRS (not shown) with the same frequency domain resource allocation may be associated within each (or all) of the hops. The data transmission may correspond to PDSCH 1020 and any repetition transmission of PDSCH 1020.

In a second example, the resource allocation scheme may correspond to slot configuration 1010. Slot configuration 1010 illustrates an example where each PDSCH repetition may occur in different slots and may use the same or different time domain resource allocations between slots, uses different frequency domain locations between slots and, in different BWPs in accordance with frequency hopping patterns. Slot configuration 1010 illustrates an example where inter-slot repetition and inter-BWP frequency hopping is configured per-BWP, which may support or otherwise allow a different or the same frequency hopping pattern to be used in the different BWPs. An indication of the frequency hopping patterns may be carried or otherwise conveyed in RRC signaling, a DCI, and the like. Slot configuration 1010 further illustrates an example including PDSCH repetition/aggregation and frequency hopping. One DCI may be used to schedule the multi-slot PDSCH frequency hopping. A RV repetition may be used with a predefined order being applied to the same frequency hop and/or to different frequency hops. The RRC configured downlink aggregation factor for the multi-slot repetition can be used in addition to the frequency hopping. The RV pattern may be repeated throughout the four slots, e.g., RV2, RV3, RV1, and RV0, or some other pattern.

Accordingly, slot configuration 1010 may begin with the base station transmitting PDCCH 1015 in the first symbol(s) of the first slot, and in a first BWP (e.g., BWP 1). The PDCCH 1015 may carry or otherwise convey an indication of the downlink grant (e.g., DCI) scheduling the data transmission (e.g., PDSCH 1020). The PDCCH 1015 may be transmitted in the full BWP. The base station may then perform the data transmission by transmitting PDSCH 1020 in the remaining symbol(s) of the first slot and on a first subband. In the second slot and still in the first BWP, the base station may again transmit the PDCCH 1015 in the first symbol(s) of the second slot using the full BWP, followed by a repetition transmission of PDSCH 1020 in the remaining symbol(s) of the second slot on the first subband and in the first BWP. In the third slot, the base station may again transmit the PDCCH 1015 in the first symbol(s) of the third slot in the second BWP and using the second full BWP, followed by a repetition transmission of PDSCH 1020 in the remaining symbol(s) of the third slot in the second BWP and using a second subband. In the fourth slot, the base station may again transmit the PDCCH 1015 in the first symbol(s) of the fourth slot in the second BWP and using the full BWP, followed by a repetition transmission of PDSCH 1020 in the remaining symbol(s) of the fourth slot in the second BWP and on the second subband. The PDSCH 1020 transmissions in each pair of the four slots may use the same frequency domain resource allocation (e.g., on the same subband). That is, slot bundling/aggregation techniques may be used in each frequency hop and may be repeated in the same frequency location before the frequency hop. In some examples, a DMRS (not shown) within the same frequency domain resource allocation may be associated within each (or all) of the hops. The data transmission may correspond to PDSCH 1020 and any repetition transmission of PDSCH 1020.

Accordingly, the UE and base station may communicate the downlink grant, and corresponding downlink data transmission scheduled by the downlink grant, in accordance to the resource allocation scheme. The resource allocations scheme may correspond to one or more of slot configurations 1005 and/or 1010.

Figure 11:
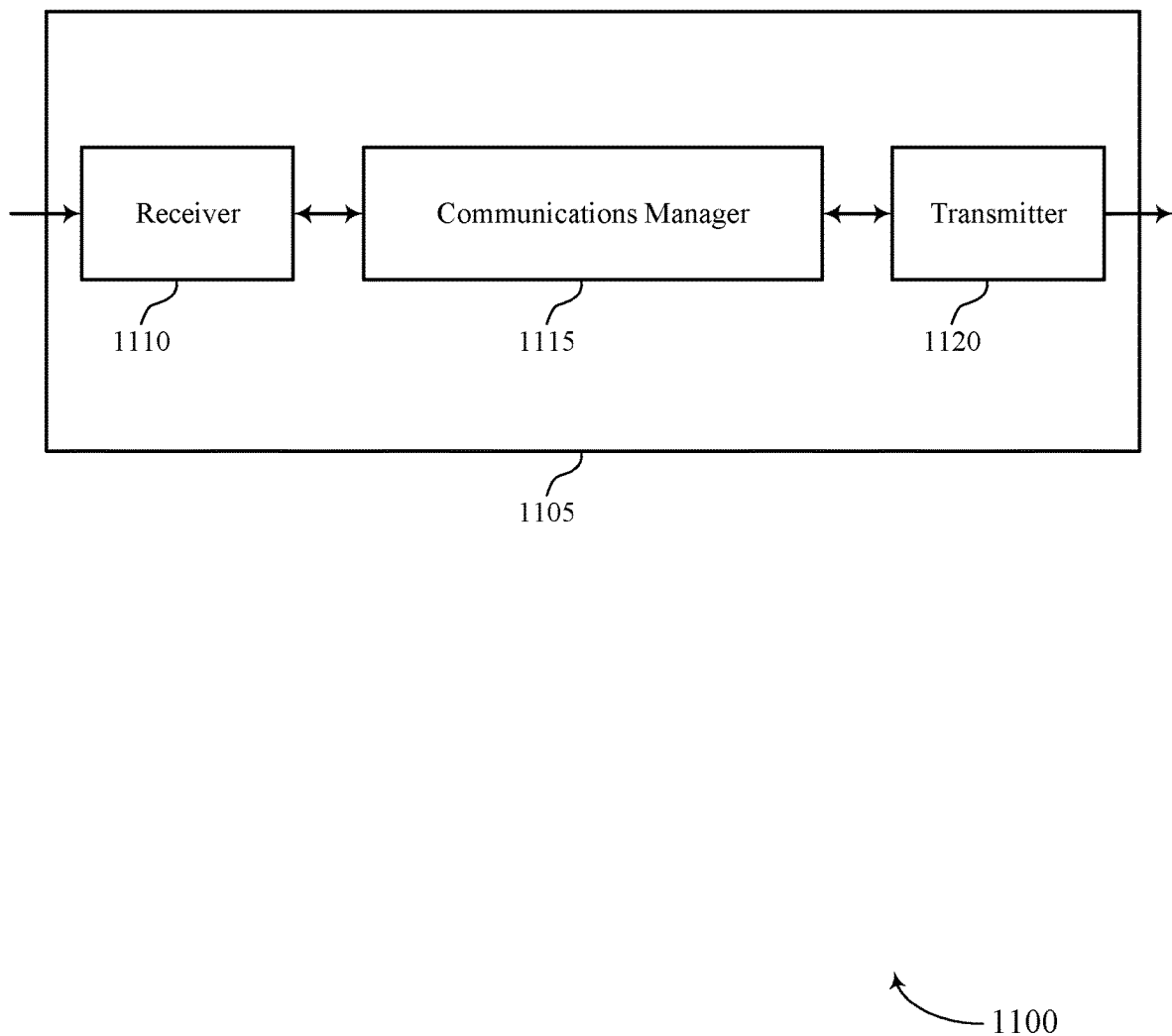
FIGS. 11 and 12 show block diagrams of devices that support PDSCH resources for reduced capability UE in accordance with aspects of the present disclosure.

FIG. 11 shows a block diagram 1100 of a device 1105 that supports PDSCH resources for reduced capability UE in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to PDSCH resources for reduced capability UE). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a UE capability message to a base station, the UE capability message including an indication of a UE type, where the UE type is associated with at least one of a reduced bandwidth, or a reduced number of antennas, or a combination thereof for the UE, receive, based on the UE capability message, a downlink grant for downlink resources for a data transmission in accordance with a resource allocation scheme, where the resource allocation scheme is associated with the UE type and a supported bandwidth part of the UE, monitor a wireless channel based on the downlink grant, and receive the data transmission based on the monitoring of the wireless channel. The communications manager 1115 may be an example of aspects of the communications manager 1410 described herein.

The communications manager 1115, or its sub-components, may be implemented in hardware, code (e.g., software) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
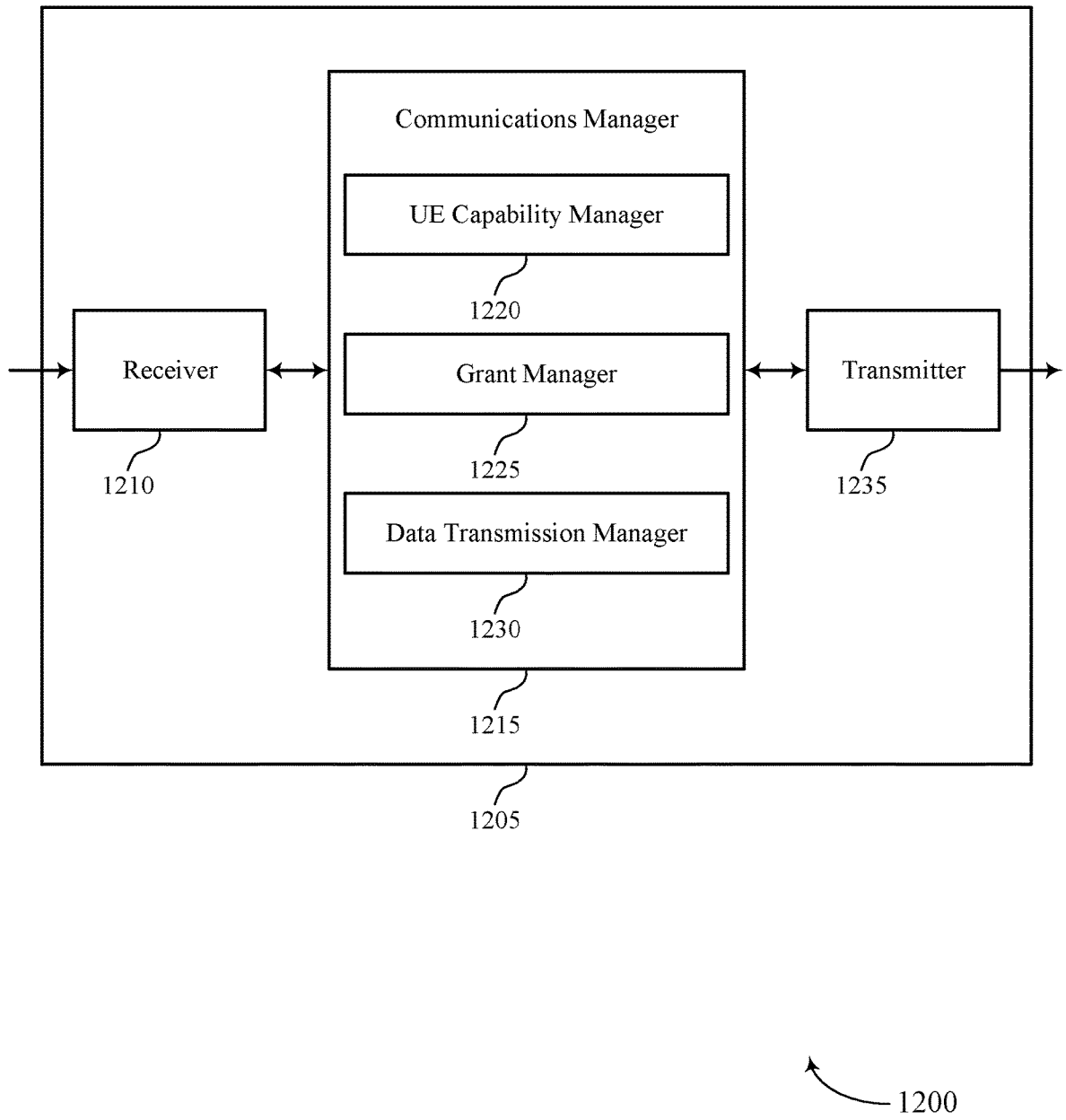

FIG. 12 shows a block diagram 1200 of a device 1205 that supports PDSCH resources for reduced capability UE in accordance with aspects of the present disclosure. The device 1205 may be an example of aspects of a device 1105, or a UE 115 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to PDSCH resources for reduced capability UE). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an UE capability manager 1220, a grant manager 1225, and a data transmission manager 1230. The communications manager 1215 may be an example of aspects of the communications manager 1410 described herein.

The UE capability manager 1220 may transmit a UE capability message to a base station, the UE capability message including an indication of a UE type, where the UE type is associated with at least one of a reduced bandwidth, or a reduced number of antennas, or a combination thereof for the UE.

The grant manager 1225 may receive, based on the UE capability message, a downlink grant for downlink resources for a data transmission in accordance with a resource allocation scheme, where the resource allocation scheme is associated with the UE type and a supported bandwidth part of the UE, and monitor a wireless channel based on the downlink grant.

The data transmission manager 1230 may receive the data transmission based on the monitoring of the wireless channel.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
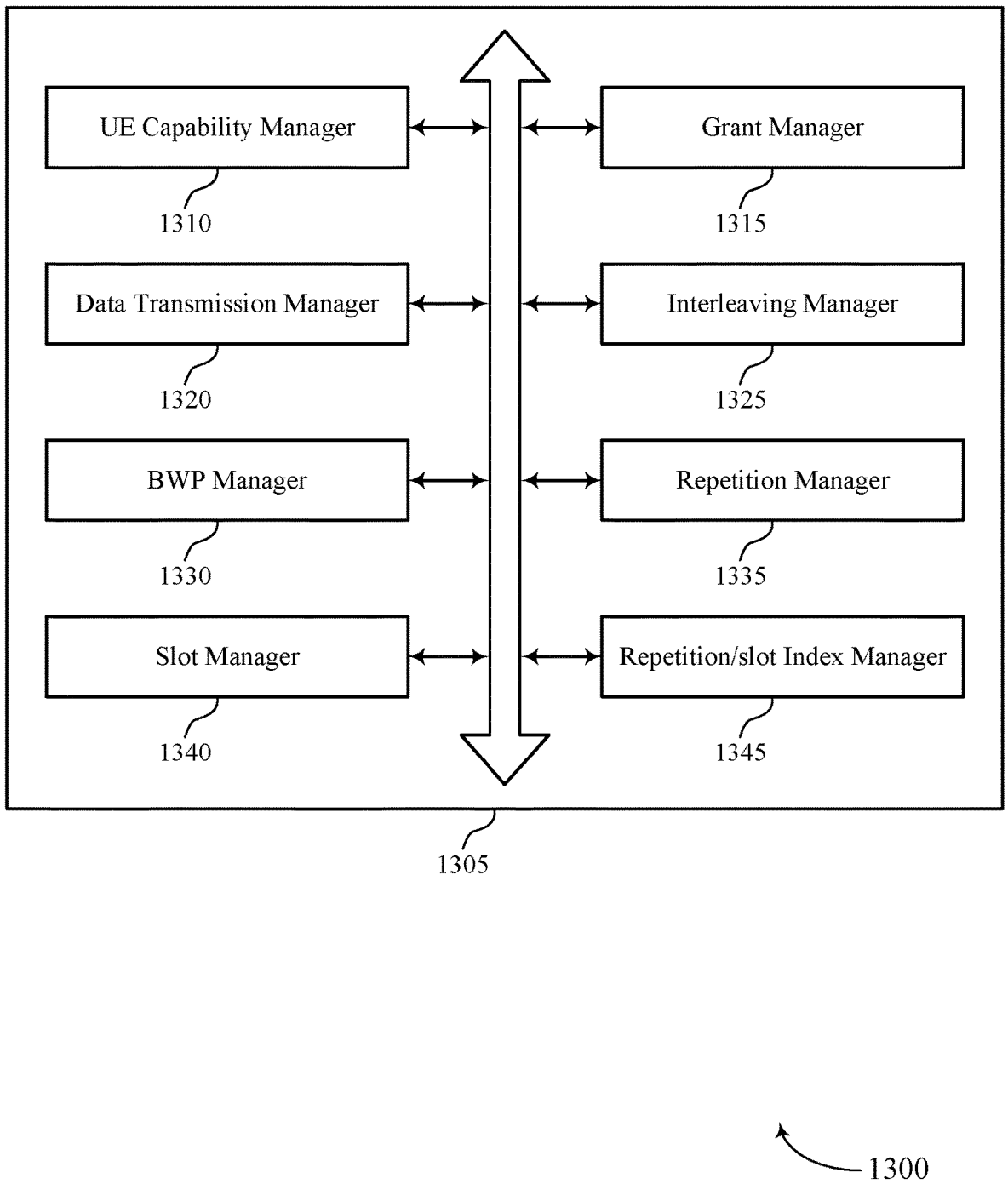
FIG. 13 shows a block diagram of a communications manager that supports PDSCH resources for reduced capability UE in accordance with aspects of the present disclosure.

FIG. 13 shows a block diagram 1300 of a communications manager 1305 that supports PDSCH resources for reduced capability UE in accordance with aspects of the present disclosure. The communications manager 1305 may be an example of aspects of a communications manager 1115, a communications manager 1215, or a communications manager 1410 described herein. The communications manager 1305 may include an UE capability manager 1310, a grant manager 1315, a data transmission manager 1320, an interleaving manager 1325, a BWP manager 1330, a repetition manager 1335, a slot manager 1340, and a repetition/slot index manager 1345. Each of these modules may communicate, directly or indirectly, with one another (e.g., via one or more buses).

The UE capability manager 1310 may transmit a UE capability message to a base station, the UE capability message including an indication of a UE type, where the UE type is associated with at least one of a reduced bandwidth, or a reduced number of antennas, or a combination thereof for the UE.

The grant manager 1315 may receive, based on the UE capability message, a downlink grant for downlink resources for a data transmission in accordance with a resource allocation scheme, where the resource allocation scheme is associated with the UE type and a supported bandwidth part of the UE. In some examples, the grant manager 1315 may monitor a wireless channel based on the downlink grant.

The data transmission manager 1320 may receive the data transmission based on the monitoring of the wireless channel.

The interleaving manager 1325 may receive the data transmission in an interleaved and discontinuous resource block spread over a subset of available subbands in the supported BWP, the subset based on the UE type.

The BWP manager 1330 may receive the data transmission over the supported BWP and using a low coding rate, the low coding rate based on the UE type.

In some examples, the BWP manager 1330 may identify a scaling factor used for the data transmission using the low coding rate based on the scaling factor of a transmit block size, the scaling factor based on the UE type. In some cases, the first DMRS transmission is transmitted during a first time period of the first portion of the slot. In some cases, the second DMRS transmission is transmitted during a second time period of the second portion of the slot, the first time period of the first portion of the slot being different from the second time period of the second portion of the slot.

The repetition manager 1335 may receive a first transmission of the data transmission and a repetition transmission of the data transmission in a slot.

In some examples, the repetition manager 1335 may identify a DMRS configuration for receiving the first transmission and the repetition transmission in the slot. In some examples, the repetition manager 1335 may receive the data transmission based on the DMRS configuration. In some examples, the repetition manager 1335 may receive a first DMRS transmission during a first portion of the slot used for the first transmission and a second DMRS transmission during a second portion of the slot used for the repetition transmission. In some examples, the repetition manager 1335 may identify, based on a downlink aggregation factor for intra-slot data repetition, a first starting symbol for the first transmission and a second starting symbol for the repetition transmission.

In some examples, the repetition manager 1335 may transmit a feedback signal for the data transmission during a subsequent slot with a time gap for processing based on the slot in which the first transmission and the repetition transmission are received. In some examples, the repetition manager 1335 may receive one or more additional repetition transmissions of the data transmission in a second slot occurring after the slot that the first transmission and the repetition transmission are received in. In some examples, the repetition manager 1335 may transmit a feedback signal during a subsequent slot with a time gap for processing based on the second slot in which the one or more repetition transmissions are received. In some cases, the first DMRS transmission is received during an initial time period of the first portion of the slot. In some cases, the second DMRS transmission is received during the initial time period of the second portion of the slot. In some cases, the first DMRS transmission is received during a first time period of the first portion of the slot used for the first transmission. In some cases, the second DMRS transmission is received during a second time period of the second portion of the slot used for the repetition transmission, the first time period of the first portion of the slot being different from the second time period of the second portion of the slot. In some cases, the first transmission and the repetition transmission occur during a same symbol configuration or a different symbol configuration in the slot.

The slot manager 1340 may receive a first portion of the data transmission in a first slot and over a first subband of the supported BWP. In some examples, the slot manager 1340 may receive a second portion of the data transmission in a second slot over a second subband of the supported BWP, where the first subband is a different subband than the second subband. In some examples, the slot manager 1340 may receive the first portion of the data transmission and the second portion of the data transmission according to a same time domain configuration or a different time domain configuration between the first slot and the second slot. In some examples, the slot manager 1340 may determine that the first subband is in a first BWP and the second subband is in a second BWP that is different from the first BWP. In some examples, the slot manager 1340 may perform a retuning operation during a returning gap between receiving the first portion and receiving the second portion. In some examples, the slot manager 1340 may receive the first portion in the first slot and the second portion in the second slot based on a RV associated with first portion and the second portion of the data transmission.

In some cases, the first subband and the second subband are in the same BWP or in a different BWP. In some cases, the retuning gap is a last portion in the first subband in a first BWP, or a first portion in the second subband in a second BWP, or a combination thereof.

The repetition/slot index manager 1345 may receive the data transmission based on a slot index, or a repetition index, or a combination thereof.

Figure 14:
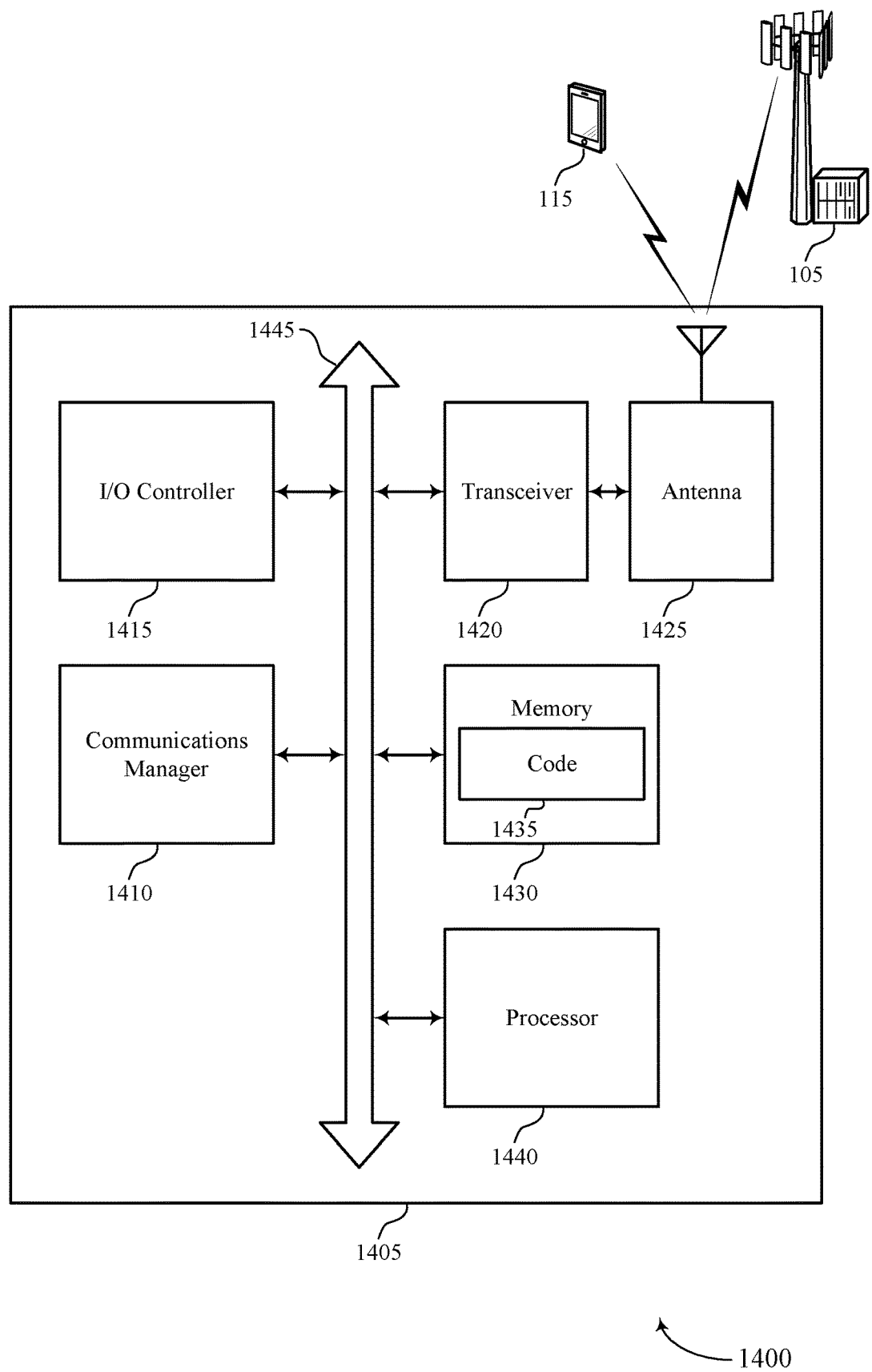
FIG. 14 shows a diagram of a system including a device that supports PDSCH resources for reduced capability UE in accordance with aspects of the present disclosure.

FIG. 14 shows a diagram of a system 1400 including a device 1405 that supports PDSCH resources for reduced capability UE in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may transmit a UE capability message to a base station, the UE capability message including an indication of a UE type, where the UE type is associated with at least one of a reduced bandwidth, or a reduced number of antennas, or a combination thereof for the UE, receive, based on the UE capability message, a downlink grant for downlink resources for a data transmission in accordance with a resource allocation scheme, where the resource allocation scheme is associated with the UE type and a supported bandwidth part of the UE, monitor a wireless channel based on the downlink grant, and receive the data transmission based on the monitoring of the wireless channel.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device 1405 via the I/O controller 1415 or via hardware components controlled by the I/O controller 1415.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include random access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting PDSCH resources for reduced capability UE).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
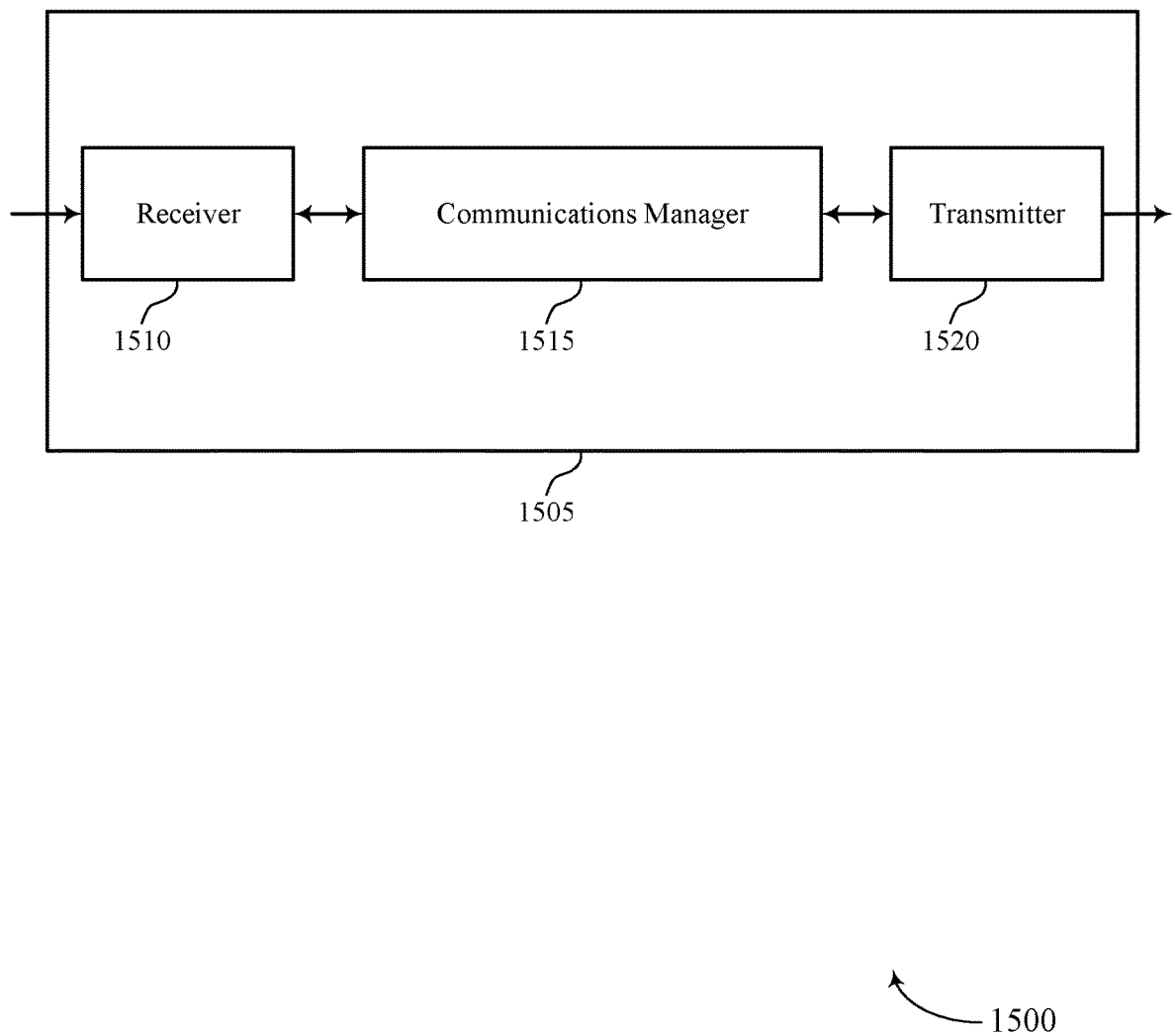
FIGS. 15 and 16 show block diagrams of devices that support PDSCH resources for reduced capability UE in accordance with aspects of the present disclosure.

FIG. 15 shows a block diagram 1500 of a device 1505 that supports PDSCH resources for reduced capability UE in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to PDSCH resources for reduced capability UE). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may receive a UE capability message from a UE, the UE capability message including an indication of a UE type, where the UE type is associated with at least one of a reduced bandwidth, or a reduced number of antennas, or a combination thereof for the UE, select, based on the UE capability message and a supported bandwidth part of the UE, a resource allocation scheme for a downlink grant for the UE, transmit the downlink grant for downlink resources for a data transmission to the UE in accordance with the resource allocation scheme, and transmit the data transmission to the UE based on the downlink grant. The communications manager 1515 may be an example of aspects of the communications manager 1810 described herein.

The communications manager 1515, or its sub-components, may be implemented in hardware, code (e.g., software) executed by a processor, or any combination thereof. If implemented in code executed by a processor, the functions of the communications manager 1515, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver module. For example, the transmitter 1520 may be an example of aspects of the transceiver 1820 described with reference to FIG. 18. The transmitter 1520 may utilize a single antenna or a set of antennas.

Figure 16:
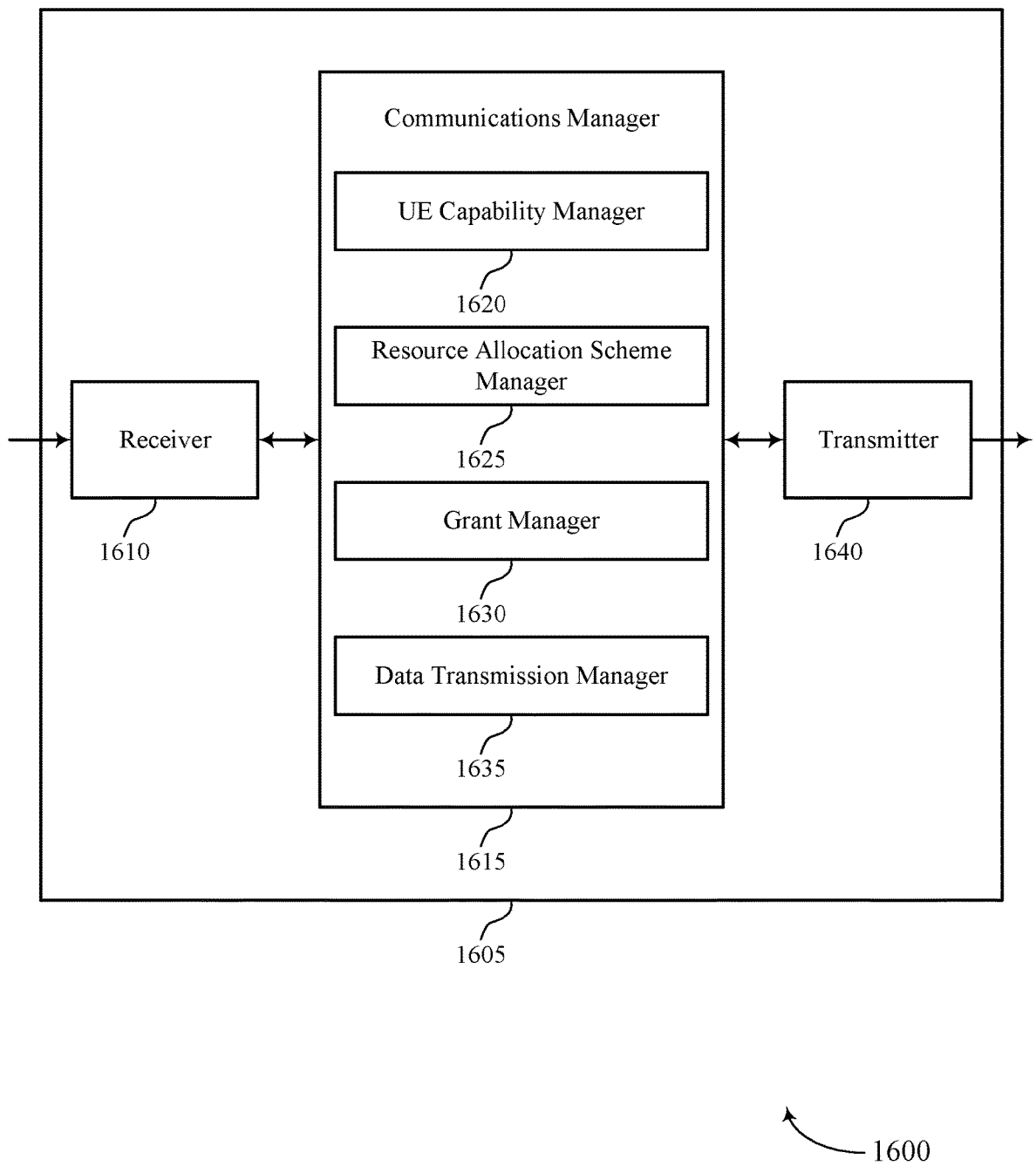

FIG. 16 shows a block diagram 1600 of a device 1605 that supports PDSCH resources for reduced capability UE in accordance with aspects of the present disclosure. The device 1605 may be an example of aspects of a device 1505, or a base station 105 as described herein. The device 1605 may include a receiver 1610, a communications manager 1615, and a transmitter 1640. The device 1605 may also include a processor. Each of these components may be in communication with one another (e.g., via one or more buses).

The receiver 1610 may receive information such as packets, user data, or control information associated with various information channels (e.g., control channels, data channels, and information related to PDSCH resources for reduced capability UE). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include an UE capability manager 1620, a resource allocation scheme manager 1625, a grant manager 1630, and a data transmission manager 1635. The communications manager 1615 may be an example of aspects of the communications manager 1810 described herein.

The UE capability manager 1620 may receive a UE capability message from a UE, the UE capability message including an indication of a UE type, where the UE type is associated with at least one of a reduced bandwidth, or a reduced number of antennas, or a combination thereof for the UE.

The resource allocation scheme manager 1625 may select, based on the UE capability message and a supported bandwidth part of the UE, a resource allocation scheme for a downlink grant for the UE.

The grant manager 1630 may transmit the downlink grant for downlink resources for a data transmission to the UE in accordance with the resource allocation scheme.

The data transmission manager 1635 may transmit the data transmission to the UE based on the downlink grant.

The transmitter 1640 may transmit signals generated by other components of the device 1605. In some examples, the transmitter 1640 may be collocated with a receiver 1610 in a transceiver module. For example, the transmitter 1640 may be an example of aspects of the transceiver 1820 described with reference to FIG. 18. The transmitter 1640 may utilize a single antenna or a set of antennas.

Figure 17:
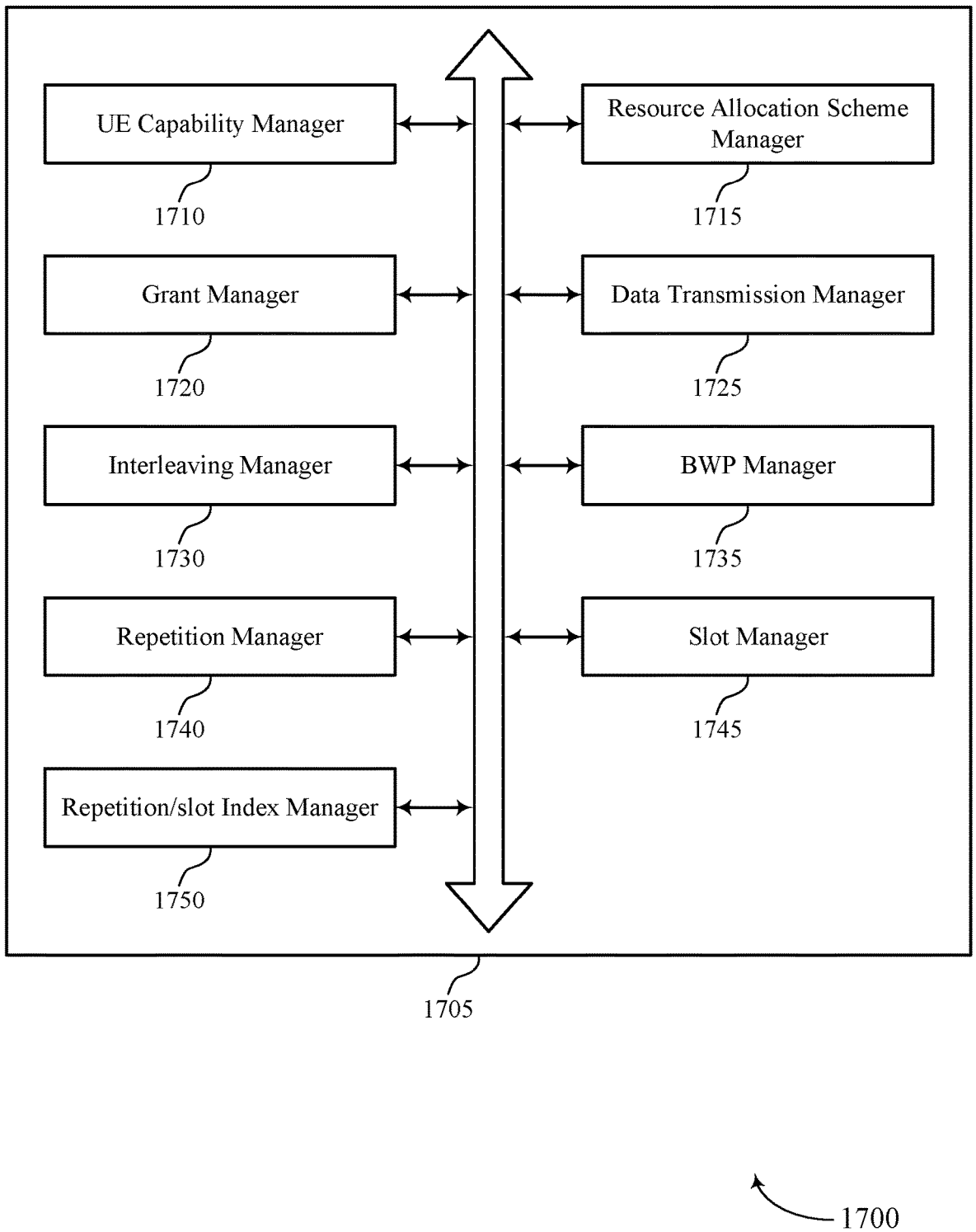
FIG. 17 shows a block diagram of a communications manager that supports PDSCH resources for reduced capability UE in accordance with aspects of the present disclosure.

FIG. 17 shows a block diagram 1700 of a communications manager 1705 that supports PDSCH resources for reduced capability UE in accordance with aspects of the present disclosure. The communications manager 1705 may be an example of aspects of a communications manager 1515, a communications manager 1615, or a communications manager 1810 described herein. The communications manager 1705 may include an UE capability manager 1710, a resource allocation scheme manager 1715, a grant manager 1720, a data transmission manager 1725, an interleaving manager 1730, a BWP manager 1735, a repetition manager 1740, a slot manager 1745, and a repetition/slot index manager 1750. Each of these modules may communicate, directly or indirectly, with one another (e.g., via one or more buses).

The UE capability manager 1710 may receive a UE capability message from a UE, the UE capability message including an indication of a UE type, where the UE type is associated with at least one of a reduced bandwidth, or a reduced number of antennas, or a combination thereof for the UE.

The resource allocation scheme manager 1715 may select, based on the UE capability message and a supported bandwidth part of the UE, a resource allocation scheme for a downlink grant for the UE.

The grant manager 1720 may transmit the downlink grant for downlink resources for a data transmission to the UE in accordance with the resource allocation scheme.

The data transmission manager 1725 may transmit the data transmission to the UE based on the downlink grant.

The interleaving manager 1730 may transmit the data transmission in an interleaved and discontinuous resource block spread over a subset of available subbands in the supported BWP, the subset based on the UE type.

The BWP manager 1735 may transmit the data transmission over the supported BWP and using a low coding rate, the low coding rate based on the UE type.

In some examples, the BWP manager 1735 may identify a scaling factor to use for the data transmission using the low coding rate based on the scaling factor of a transmit block size, the scaling factor based on the UE type.

The repetition manager 1740 may transmit a first transmission of the data transmission and a repetition transmission of the data transmission in a slot. In some examples, the repetition manager 1740 may identify a DMRS configuration for transmitting the first transmission and the repetition transmission in the slot. In some examples, the repetition manager 1740 may transmit the data transmission based on the DMRS configuration. In some examples, the repetition manager 1740 may transmit a first DMRS transmission during a first portion of the slot used for the first transmission and a second DMRS transmission during a second portion of the slot used for the repetition transmission. In some examples, the repetition manager 1740 may identify, based on a downlink aggregation factor for intra-slot data repetition, a first starting symbol for the first transmission and a second starting symbol for the repetition transmission. In some examples, the repetition manager 1740 may receive a feedback signal for the data transmission during a subsequent slot with a time gap for processing based on the slot in which the first transmission and the repetition transmission are transmitted.

In some examples, the repetition manager 1740 may transmit one or more additional repetition transmissions of the data transmission in a second slot occurring after the slot that the first transmission and the repetition transmission are transmitted. In some examples, the repetition manager 1740 may receive a feedback signal during a subsequent slot with a time gap for processing based on the second slot in which the one or more repetition transmissions are transmitted. In some cases, the first DMRS transmission is transmitted during an initial time period of the first portion of the slot used for the first transmission. In some cases, the second DMRS transmission is transmitted during the initial time period of the second portion of the slot used for the repetition transmission. In some cases, the first transmission and the repetition transmission occur during a same symbol configuration or a different symbol configuration in the slot.

The slot manager 1745 may transmit a first portion of the data transmission in a first slot and over a first subband of the supported BWP. In some examples, the slot manager 1745 may transmit a second portion of the data transmission in a second slot over a second subband of the supported BWP, where the first subband is a different subband than the second subband. In some examples, the slot manager 1745 may transmit the first portion of the data transmission and the second portion of the data transmission according to a same time domain configuration or a different time domain configuration between the first slot and the second slot. In some examples, the slot manager 1745 may determine that the first subband is in a first BWP and the second subband is in a second BWP that is different from the first BWP. In some examples, the slot manager 1745 may configure a retuning gap between transmitting the first portion and receiving the second portion. In some examples, the slot manager 1745 may transmit the first portion in the first slot and the second portion in the second slot based on a RV associated with first portion and the second portion of the data transmission.

In some cases, the first subband and the second subband are in the same BWP or in a different BWP. In some cases, the retuning gap includes a last portion in the first subband in a first BWP, or a first portion in the second subband in a second BWP, or a combination thereof.

The repetition/slot index manager 1750 may transmit the data transmission based on a slot index, or a repetition index, or a combination thereof.

Figure 18:
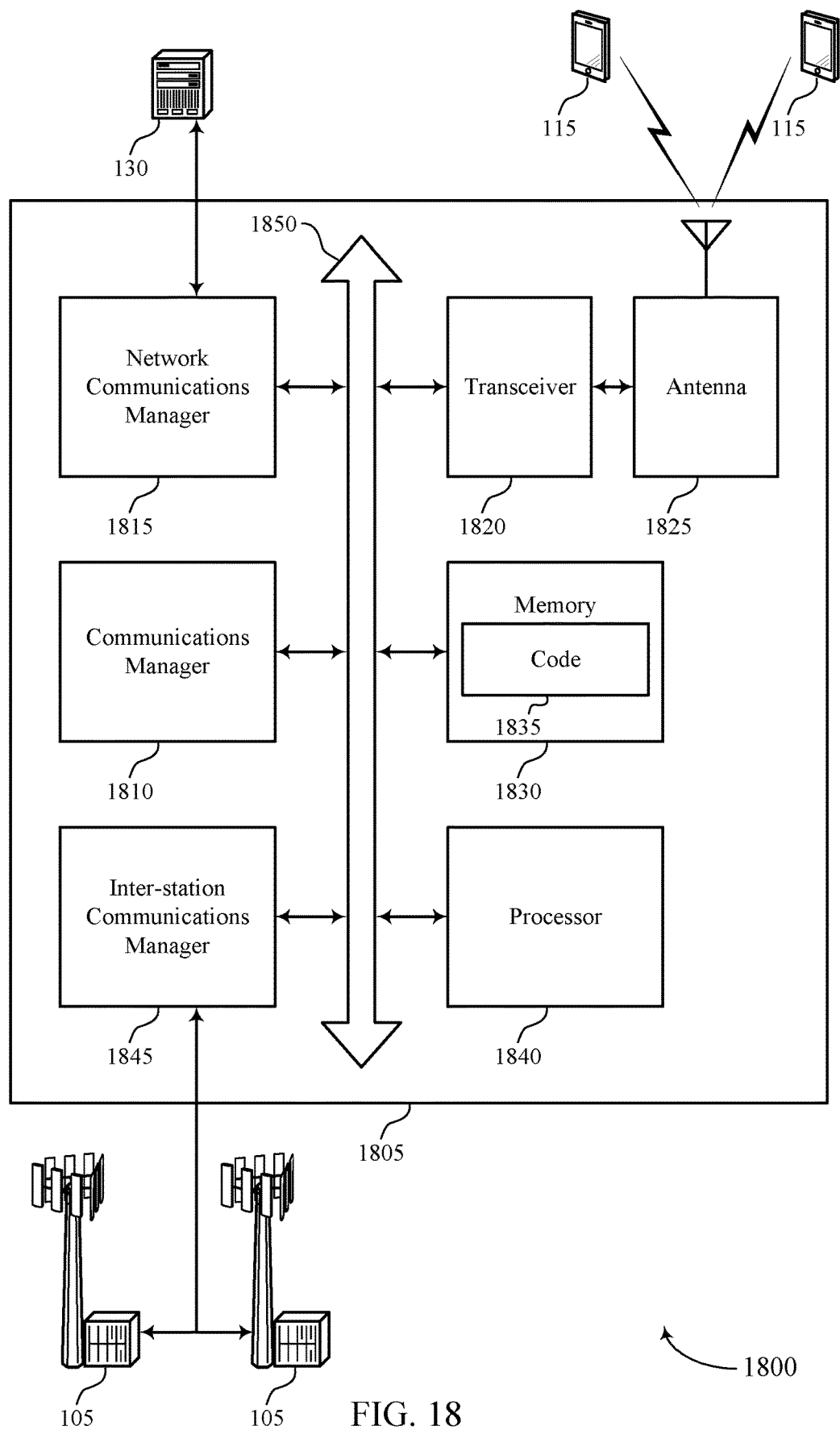
FIG. 18 shows a diagram of a system including a device that supports PDSCH resources for reduced capability UE in accordance with aspects of the present disclosure.

FIG. 18 shows a diagram of a system 1800 including a device 1805 that supports PDSCH resources for reduced capability UE in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may receive a UE capability message from a UE, the UE capability message including an indication of a UE type, where the UE type is associated with at least one of a reduced bandwidth, or a reduced number of antennas, or a combination thereof for the UE, select, based on the UE capability message and a supported bandwidth part of the UE, a resource allocation scheme for a downlink grant for the UE, transmit the downlink grant for downlink resources for a data transmission to the UE in accordance with the resource allocation scheme, and transmit the data transmission to the UE based on the downlink grant.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described above. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas.

In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting PDSCH resources for reduced capability UE).

The inter-station communications manager 1845 may manage communications with other base station 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communication network technology to provide communication between base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
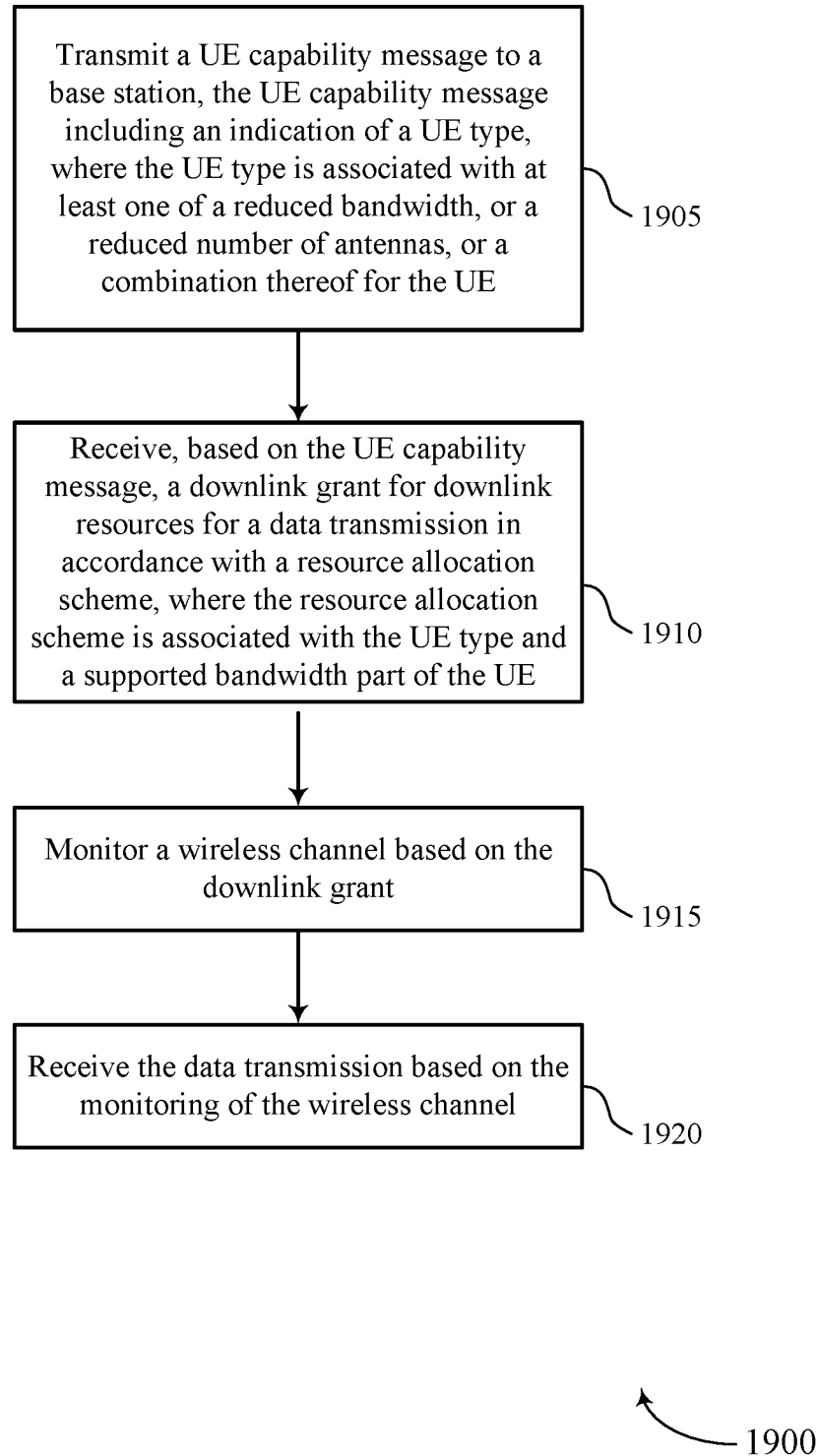
FIGS. 19 through 22 show flowcharts illustrating methods that support PDSCH resources for reduced capability UE in accordance with aspects of the present disclosure.

FIG. 19 shows a flowchart illustrating a method 1900 that supports PDSCH resources for reduced capability UE in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 1905, the UE may transmit a UE capability message to a base station, the UE capability message including an indication of a UE type, where the UE type is associated with at least one of a reduced bandwidth, or a reduced number of antennas, or a combination thereof for the UE. The operations of 1905 may be performed according to the methods described herein. In some examples, aspects of the operations of 1905 may be performed by an UE capability manager as described with reference to FIGS. 11 through 14.

At 1910, the UE may receive, based on the UE capability message, a downlink grant for downlink resources for a data transmission in accordance with a resource allocation scheme, where the resource allocation scheme is associated with the UE type and a supported bandwidth part of the UE. The operations of 1910 may be performed according to the methods described herein. In some examples, aspects of the operations of 1910 may be performed by a grant manager as described with reference to FIGS. 11 through 14.

At 1915, the UE may monitor a wireless channel based on the downlink grant. The operations of 1915 may be performed according to the methods described herein. In some examples, aspects of the operations of 1915 may be performed by a grant manager as described with reference to FIGS. 11 through 14.

At 1920, the UE may receive the data transmission based on the monitoring of the wireless channel. The operations of 1920 may be performed according to the methods described herein. In some examples, aspects of the operations of 1920 may be performed by a data transmission manager as described with reference to FIGS. 11 through 14.

Figure 20:
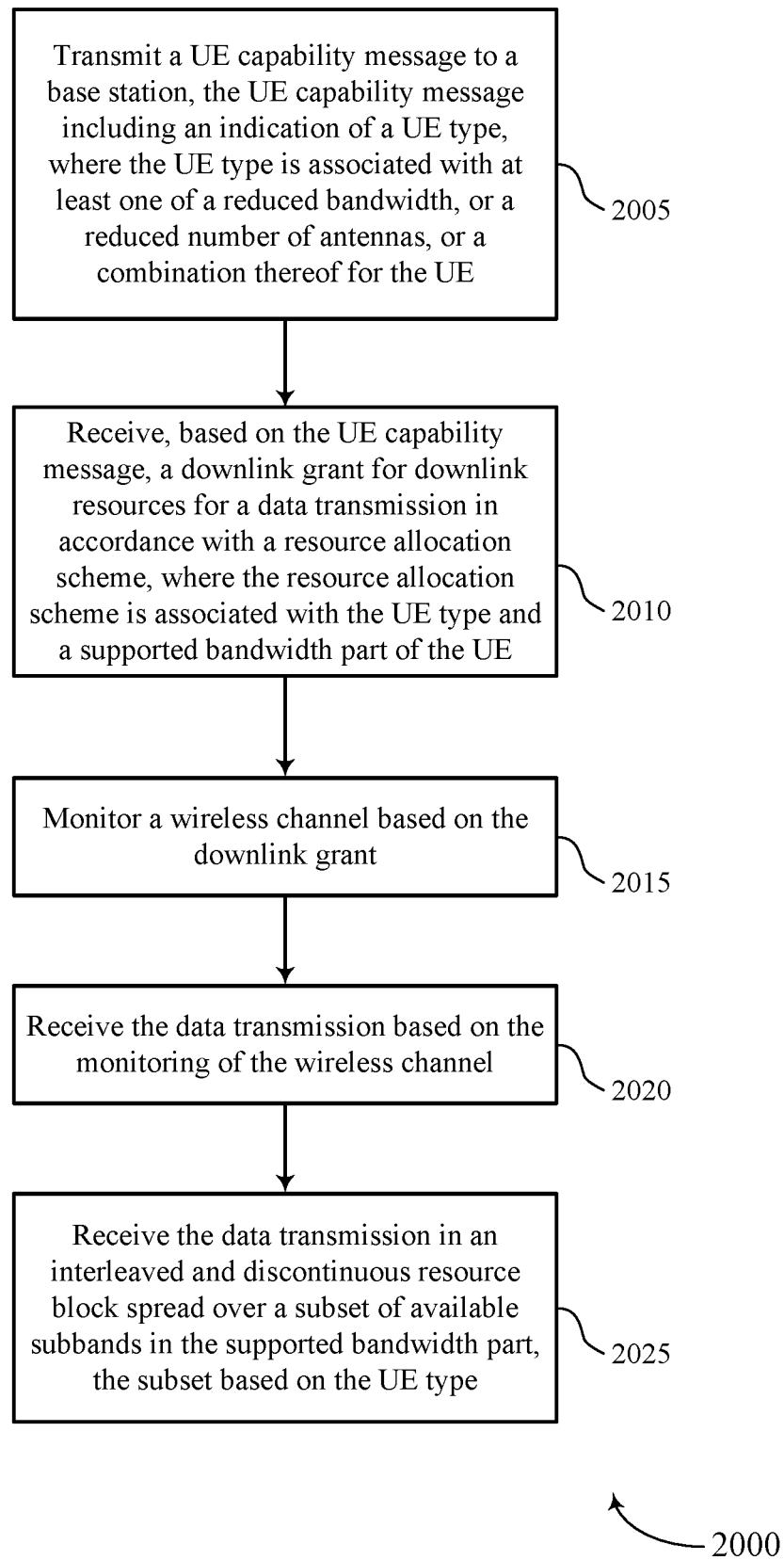

FIG. 20 shows a flowchart illustrating a method 2000 that supports PDSCH resources for reduced capability UE in accordance with aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described below. Additionally or alternatively, a UE may perform aspects of the functions described below using special-purpose hardware.

At 2005, the UE may transmit a UE capability message to a base station, the UE capability message including an indication of a UE type, where the UE type is associated with at least one of a reduced bandwidth, or a reduced number of antennas, or a combination thereof for the UE. The operations of 2005 may be performed according to the methods described herein. In some examples, aspects of the operations of 2005 may be performed by an UE capability manager as described with reference to FIGS. 11 through 14.

At 2010, the UE may receive, based on the UE capability message, a downlink grant for downlink resources for a data transmission in accordance with a resource allocation scheme, where the resource allocation scheme is associated with the UE type and a supported bandwidth part of the UE. The operations of 2010 may be performed according to the methods described herein. In some examples, aspects of the operations of 2010 may be performed by a grant manager as described with reference to FIGS. 11 through 14.

At 2015, the UE may monitor a wireless channel based on the downlink grant. The operations of 2015 may be performed according to the methods described herein. In some examples, aspects of the operations of 2015 may be performed by a grant manager as described with reference to FIGS. 11 through 14.

At 2020, the UE may receive the data transmission based on the monitoring of the wireless channel. The operations of 2020 may be performed according to the methods described herein. In some examples, aspects of the operations of 2020 may be performed by a data transmission manager as described with reference to FIGS. 11 through 14.

At 2025, the UE may receive the data transmission in an interleaved and discontinuous resource block spread over a subset of available subbands in the supported BWP, the subset based on the UE type. The operations of 2025 may be performed according to the methods described herein. In some examples, aspects of the operations of 2025 may be performed by an interleaving manager as described with reference to FIGS. 11 through 14.

Figure 21:
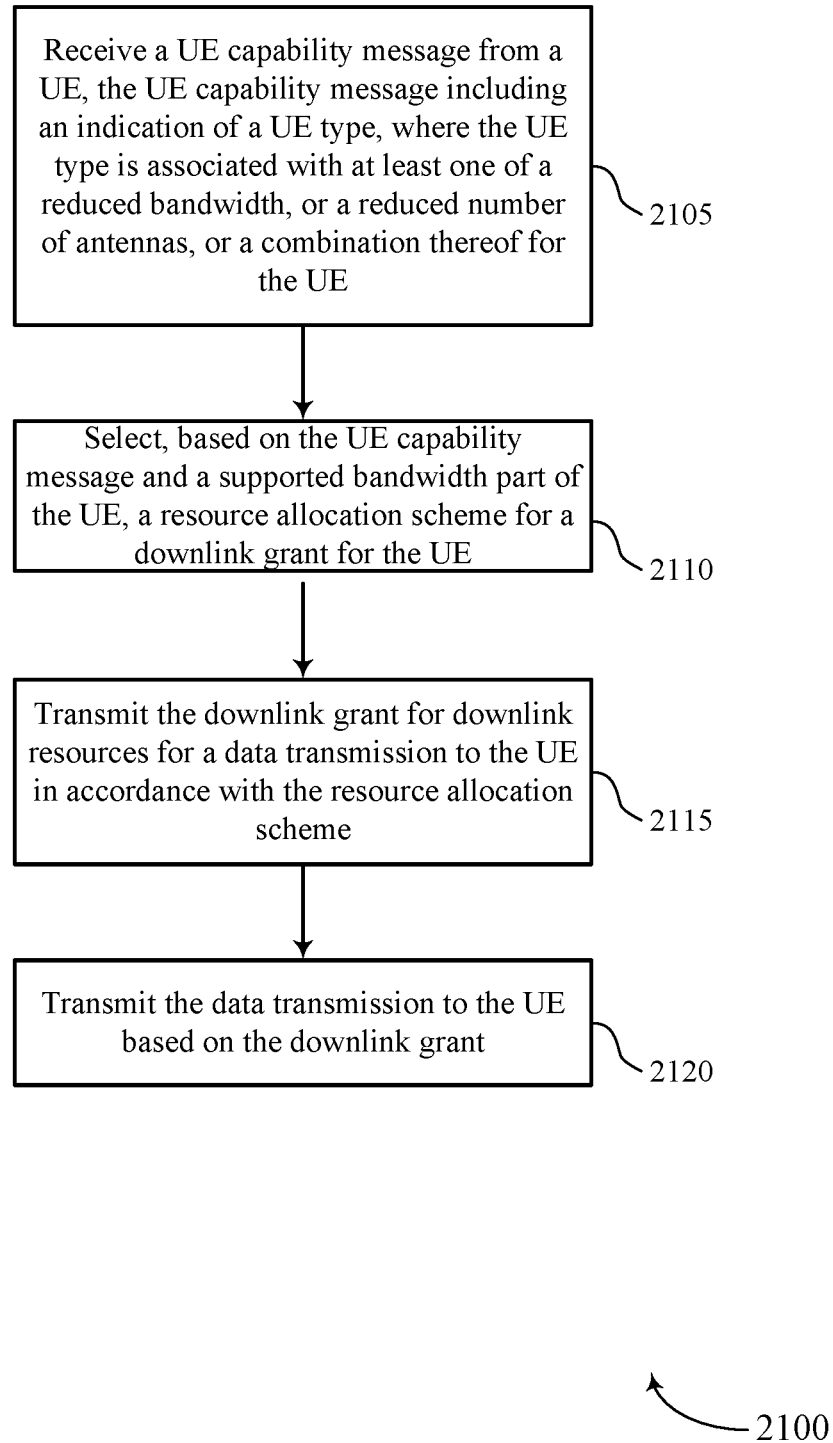

FIG. 21 shows a flowchart illustrating a method 2100 that supports PDSCH resources for reduced capability UE in accordance with aspects of the present disclosure. The operations of method 2100 may be implemented by a base station 105 or its components as described herein. For example, the operations of method 2100 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2105, the base station may receive a UE capability message from a UE, the UE capability message including an indication of a UE type, where the UE type is associated with at least one of a reduced bandwidth, or a reduced number of antennas, or a combination thereof for the UE. The operations of 2105 may be performed according to the methods described herein. In some examples, aspects of the operations of 2105 may be performed by an UE capability manager as described with reference to FIGS. 15 through 18.

At 2110, the base station may select, based on the UE capability message and a supported bandwidth part of the UE, a resource allocation scheme for a downlink grant for the UE. The operations of 2110 may be performed according to the methods described herein. In some examples, aspects of the operations of 2110 may be performed by a resource allocation scheme manager as described with reference to FIGS. 15 through 18.

At 2115, the base station may transmit the downlink grant for downlink resources for a data transmission to the UE in accordance with the resource allocation scheme. The operations of 2115 may be performed according to the methods described herein. In some examples, aspects of the operations of 2115 may be performed by a grant manager as described with reference to FIGS. 15 through 18.

At 2120, the base station may transmit the data transmission to the UE based on the downlink grant. The operations of 2120 may be performed according to the methods described herein. In some examples, aspects of the operations of 2120 may be performed by a data transmission manager as described with reference to FIGS. 15 through 18.

Figure 22:
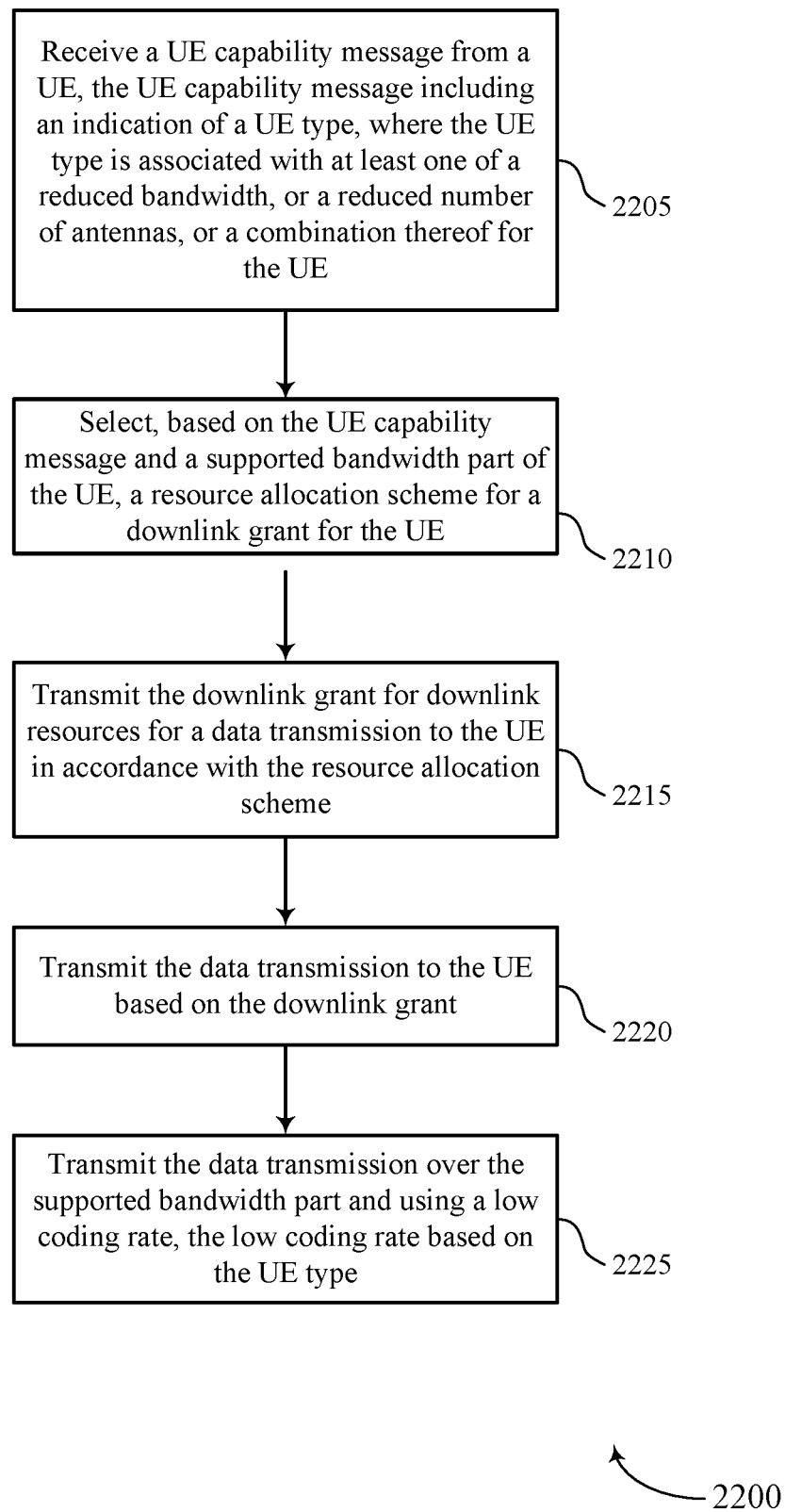

FIG. 22 shows a flowchart illustrating a method 2200 that supports PDSCH resources for reduced capability UE in accordance with aspects of the present disclosure. The operations of method 2200 may be implemented by a base station 105 or its components as described herein. For example, the operations of method 2200 may be performed by a communications manager as described with reference to FIGS. 15 through 18. In some examples, a base station may execute a set of instructions to control the functional elements of the base station to perform the functions described below. Additionally or alternatively, a base station may perform aspects of the functions described below using special-purpose hardware.

At 2205, the base station may receive a UE capability message from a UE, the UE capability message including an indication of a UE type, where the UE type is associated with at least one of a reduced bandwidth, or a reduced number of antennas, or a combination thereof for the UE. The operations of 2205 may be performed according to the methods described herein. In some examples, aspects of the operations of 2205 may be performed by an UE capability manager as described with reference to FIGS. 15 through 18.

At 2210, the base station may select, based on the UE capability message and a supported bandwidth part of the UE, a resource allocation scheme for a downlink grant for the UE. The operations of 2210 may be performed according to the methods described herein. In some examples, aspects of the operations of 2210 may be performed by a resource allocation scheme manager as described with reference to FIGS. 15 through 18.

At 2215, the base station may transmit the downlink grant for downlink resources for a data transmission to the UE in accordance with the resource allocation scheme. The operations of 2215 may be performed according to the methods described herein. In some examples, aspects of the operations of 2215 may be performed by a grant manager as described with reference to FIGS. 15 through 18.

At 2220, the base station may transmit the data transmission to the UE based on the downlink grant. The operations of 2220 may be performed according to the methods described herein. In some examples, aspects of the operations of 2220 may be performed by a data transmission manager as described with reference to FIGS. 15 through 18.

At 2225, the base station may transmit the data transmission over the supported BWP and using a low coding rate, the low coding rate based on the UE type. The operations of 2225 may be performed according to the methods described herein. In some examples, aspects of the operations of 2225 may be performed by a BWP manager as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000 or Universal Terrestrial Radio Access (UTRA). CDMA2000 covers IS-2000, IS-95, and IS-856 standards. IS-2000 Releases may be commonly referred to as CDMA2000 1x, or 1x. IS-856 (TIA-856) is commonly referred to as CDMA2000 1xEV-DO, or High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, or Flash-OFDM. UTRA and E-UTRA are part of Universal Mobile Telecommunication system (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). A base station for a macro cell may be referred to as a macro base station (e.g., macro eNB or macro gNB). A base station for a small cell may be referred to as a small base station (e.g., small cell eNB or small cell gNB), a pico base station (e.g., pico eNB or pico gNB), a femto base station (e.g., femto eNB or femto gNB), or a home base station (e.g., home eNB or home gNB). A base station may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   transmitting a UE capability message to a network device, the UE capability message including an indication of a UE type, wherein the UE type is associated with at least one of a reduced bandwidth, or a reduced number of antennas, or a combination thereof for the UE;
   receiving, based at least in part on the UE capability message, a downlink grant for downlink resources for a data transmission in accordance with a distributed resource allocation scheme, wherein the distributed resource allocation scheme is associated with the UE type and a supported bandwidth part of the UE; and
   receiving, according to the downlink grant, a first transmission and a repetition transmission of the data transmission in a slot of the supported bandwidth part using a coding rate based at least in part on the UE type, wherein the data transmission is received according to the distributed resource allocation scheme that comprises an interleaved and discontinuous resource block spread over a subset of available subbands in the supported bandwidth part and the subset is based at least in part on the UE type, wherein the first transmission and the repetition transmission are received based at least in part on a demodulation reference signal (DMRS) configuration associated with the slot.

2. The method of claim 1, wherein
   the coding rate based at least in part on the UE type comprises a low coding rate below a threshold coding rate.

3. The method of claim 2, further comprising:
   identifying a scaling factor of a transport block size used for the data transmission using the low coding rate, the scaling factor based at least in part on the UE type.

4. The method of claim 2, further comprising:
   receiving a first demodulation reference signal (DMRS) transmission used for the first transmission of the data transmission during a first time period of a first portion of the slot; and
   receiving a second DMRS transmission used for the repetition transmission of the data transmission during a second time period of a second portion of the slot, the first time period of the first portion of the slot being different from the second time period of the second portion of the slot.

5. The method of claim 1, further comprising:
   identifying the DMRS configuration for receiving the first transmission and the repetition transmission in the slot; and
   receiving the data transmission based at least in part on the DMRS configuration.

6. The method of claim 5, wherein the DMRS configuration comprises:
   receiving a first DMRS transmission during a first portion of the slot used for the first transmission and a second DMRS transmission during a second portion of the slot used for the repetition transmission.

7. The method of claim 6, wherein:
   the first DMRS transmission is received during an initial time period of the first portion of the slot; and
   the second DMRS transmission is received during the initial time period of the second portion of the slot.

8. The method of claim 6, wherein:
   the first DMRS transmission is received during a first time period of the first portion of the slot used for the first transmission; and
   the second DMRS transmission is received during a second time period of the second portion of the slot used for the repetition transmission, the first time period of the first portion of the slot being different from the second time period of the second portion of the slot.

9. The method of claim 1, wherein the first transmission and the repetition transmission occur during a same symbol configuration or a different symbol configuration in the slot.

10. The method of claim 1, further comprising:
    identifying, based at least in part on a downlink aggregation factor for intra-slot data repetition, a first starting symbol for the first transmission and a second starting symbol for the repetition transmission.

11. The method of claim 1, further comprising:
    transmitting a feedback signal for the data transmission during a subsequent slot with a time gap for processing based at least in part on the slot in which the first transmission and the repetition transmission are received.

12. The method of claim 1, further comprising:
    receiving one or more additional repetition transmissions of the data transmission in a second slot occurring after the slot that the first transmission and the repetition transmission are received in; and
    transmitting a feedback signal during a subsequent slot with a time gap for processing based at least in part on the second slot in which the one or more additional repetition transmissions are received.

13. The method of claim 1, further comprising:
    receiving the data transmission based at least in part on a slot index, or a repetition index, or a combination thereof.

14. A method for wireless communication at a network device, comprising:
    receiving a user equipment (UE) capability message from a UE, the UE capability message including an indication of a UE type, wherein the UE type is associated with at least one of a reduced bandwidth, or a reduced number of antennas, or a combination thereof for the UE;

selecting, based at least in part on the UE capability message and a supported bandwidth part of the UE, a distributed resource allocation scheme for a downlink grant for the UE;

transmitting the downlink grant for downlink resources for a data transmission to the UE in accordance with the distributed resource allocation scheme; and transmitting, according to the downlink grant, a first transmission and a repetition transmission of the data transmission to the UE in a slot of the supported bandwidth part using a coding rate based at least in part on the UE type, wherein the data transmission is transmitted according to the distributed resource allocation scheme that comprises an interleaved and discontinuous resource block spread over a subset of available subbands in the supported bandwidth part and the subset is based at least in part on the UE type, wherein the first transmission and the repetition transmission are transmitted based at least in part on a demodulation reference signal (DMRS) configuration associated with the slot.

15. The method of claim 14, wherein
the coding rate based at least in part on the UE type comprises a low coding rate below a threshold coding rate.

16. The method of claim 15, further comprising:
identifying a scaling factor of a transport block size to use for the data transmission using the low coding rate, the scaling factor based at least in part on the UE type.

17. The method of claim 14, further comprising:
identifying the DMRS configuration for transmitting the first transmission and the repetition transmission in the slot; and
transmitting the data transmission based at least in part on the DMRS configuration.

18. The method of claim 17, wherein the DMRS configuration comprises:
transmitting a first DMRS transmission during a first portion of the slot used for the first transmission and a second DMRS transmission during a second portion of the slot used for the repetition transmission.

19. The method of claim 18, wherein:
the first DMRS transmission is transmitted during an initial time period of the first portion of the slot used for the first transmission; and
the second DMRS transmission is transmitted during the initial time period of the second portion of the slot used for the repetition transmission.

20. An apparatus for wireless communication at a user equipment (UE), comprising:
at least one processor, and
memory coupled with the at least one processor, the memory storing instructions executable by the at least one processor to cause the UE to:
transmit a UE capability message to a network device, the UE capability message including an indication of a UE type, wherein the UE type is associated with at least one of a reduced bandwidth, or a reduced number of antennas, or a combination thereof for the UE;

receive, based at least in part on the UE capability message, a downlink grant for downlink resources for a data transmission in accordance with a distributed resource allocation scheme, wherein the distributed resource allocation scheme is associated with the UE type and a supported bandwidth part of the UE; and receive, according to the downlink grant, a first transmission and a repetition transmission of the data transmission in a slot of the supported bandwidth part using a coding rate based at least in part on the UE type, wherein the data transmission is received according to the distributed resource allocation scheme that comprises an interleaved and discontinuous resource block spread over a subset of available subbands in the supported bandwidth part and the subset is based at least in part on the UE type, wherein the first transmission and the repetition transmission are received based at least in part on a demodulation reference signal (DMRS) configuration associated with the slot.

21. An apparatus for wireless communication at a network device, comprising:
at least one processor, and
memory coupled with the at least one processor, the memory storing instructions executable by the at least one processor to cause the network device to:
receive a user equipment (UE) capability message from a UE, the UE capability message including an indication of a UE type, wherein the UE type is associated with at least one of a reduced bandwidth, or a reduced number of antennas, or a combination thereof for the UE;
select, based at least in part on the UE capability message and a supported bandwidth part of the UE, a distributed resource allocation scheme for a downlink grant for the UE;
transmit the downlink grant for downlink resources for a data transmission to the UE in accordance with the distributed resource allocation scheme; and
transmit, according to the downlink grant, a first transmission and a repetition transmission of the data transmission to the UE in a slot of the supported bandwidth part using a coding rate based at least in part on the UE type, wherein the data transmission is transmitted according to the distributed resource allocation scheme that comprises an interleaved and discontinuous resource block spread over a subset of available subbands in the supported bandwidth part and the subset is based at least in part on the UE type, wherein the first transmission and the repetition transmission are transmitted based at least in part on a demodulation reference signal (DMRS) configuration associated with the slot.

* * * * *